(12) United States Patent
Takai et al.

(10) Patent No.: US 9,045,344 B2
(45) Date of Patent: Jun. 2, 2015

(54) METHOD FOR PRODUCING ALIGNED CARBON NANOTUBE AGGREGATE

(75) Inventors: Hirokazu Takai, Tokyo (JP); Mitsugu Uejima, Tokyo (JP); The Ban Hoang, Tokyo (JP); Kenji Hata, Tsukuba (JP); Motoo Yumura, Tsukuba (JP)

(73) Assignees: ZEON CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 245 days.

(21) Appl. No.: 13/581,812

(22) PCT Filed: Feb. 28, 2011

(86) PCT No.: PCT/JP2011/054516
§ 371 (c)(1),
(2), (4) Date: Aug. 30, 2012

(87) PCT Pub. No.: WO2011/108492
PCT Pub. Date: Sep. 9, 2011

(65) Prior Publication Data
US 2012/0321544 A1    Dec. 20, 2012

(30) Foreign Application Priority Data

Mar. 1, 2010   (JP) .................................. 2010-044504
Sep. 29, 2010  (JP) .................................. 2010-219577

(51) Int. Cl.
*D01F 9/12*   (2006.01)
*B82Y 40/00*  (2011.01)
(Continued)

(52) U.S. Cl.
CPC ........... *C01B 31/0226* (2013.01); *B01J 23/745* (2013.01); *B01J 37/0217* (2013.01);
(Continued)

(58) Field of Classification Search
CPC .............. C01B 31/022; C01B 31/0226; C01B 31/0233; C01B 1/024; C01B 31/0246; C01B 31/0253; C01B 31/026; C01B 31/0266; C01B 31/0273; C01B 31/028; C01B 31/0286; C01B 31/0293
USPC ........ 423/447.1–447.3, 445 B; 977/742–754, 977/842–848
See application file for complete search history.

(56) References Cited

U.S. PATENT DOCUMENTS

2003/0147801 A1   8/2003   Someya et al.
2003/0211029 A1*  11/2003  Someya et al. ............ 423/447.3
(Continued)

FOREIGN PATENT DOCUMENTS

JP   2002-338221 A   11/2002
JP   2003-171108 A   6/2003
(Continued)

OTHER PUBLICATIONS

International Search Report, issued in PCT/JP2011/054516, dated May 24, 2011.
(Continued)

*Primary Examiner* — Daniel C McCracken
(74) *Attorney, Agent, or Firm* — Birch, Stewart, Kolasch & Birch, LLP

(57) ABSTRACT

A production method in accordance with the present invention includes the steps of: providing a catalyst support layer by applying, to a substrate, a catalyst support layer coating agent obtained by dissolving in an organic solvent (i) an organometallic compound containing aluminum and/or a metal salt containing aluminum and (ii) a stabilizer for inhibiting a condensation polymerization reaction of the organometallic compound and/or the metal salt; providing a catalyst formation layer by applying, to the catalyst support layer, a catalyst formation layer coating agent obtained by dissolving in an organic solvent (a) an organometallic compound containing iron and/or a metal salt containing iron and (b) a stabilizer for inhibiting a condensation polymerization reaction of the organometallic compound and/or the metal salt; and growing an aligned carbon nanotube aggregate on the substrate by chemical vapor deposition (CVD).

17 Claims, 5 Drawing Sheets

(51) Int. Cl.
  *C01B 31/02* (2006.01)
  *B01J 23/745* (2006.01)
  *B01J 37/02* (2006.01)
  *B82Y 30/00* (2011.01)

(52) U.S. Cl.
  CPC .......... *B01J37/0219* (2013.01); *B01J 37/0225* (2013.01); *B01J 37/0244* (2013.01); *B82Y 30/00* (2013.01); *B82Y 40/00* (2013.01); *C01B 2202/08* (2013.01)

(56) References Cited

U.S. PATENT DOCUMENTS

| | | |
|---|---|---|
| 2006/0083674 A1 | 4/2006 | Maruyama et al. |
| 2008/0318049 A1 | 12/2008 | Hata et al. |
| 2010/0062229 A1 | 3/2010 | Hata et al. |
| 2010/0196600 A1 | 8/2010 | Shibuya et al. |
| 2010/0291297 A1 | 11/2010 | Nagasaka et al. |
| 2011/0008617 A1 | 1/2011 | Hata et al. |
| 2011/0116995 A1 | 5/2011 | Shibuya et al. |
| 2011/0117365 A1 | 5/2011 | Hata et al. |

FOREIGN PATENT DOCUMENTS

| | | |
|---|---|---|
| JP | 2005-263589 A | 9/2005 |
| JP | 2007-268319 A | 10/2007 |
| JP | 2008-169092 A | 7/2008 |
| WO | WO 2004/071654 A1 | 8/2004 |
| WO | WO 2006/011655 A1 | 2/2006 |
| WO | WO 2009/038172 A1 | 3/2009 |
| WO | WO 2009/128349 A1 | 10/2009 |

OTHER PUBLICATIONS

Yasuda et al., "Improved and Large Area Single-Walled Carbon Nanotube Forest Growth by Controlling the Gas Flow Direction," ACS NANO, vol. 3, No. 12, Nov. 30, 2009, pp. 4164-4170.

Zhao et al., "Exploring Advantages of Diverse Carbon Nanotube Forests with Tailored Structures Synthesized by Supergrowth from Engineered Catalysts," ACS NANO, vol. 3, No. 1, Dec. 22, 2008, pp. 108-114.

Chinese Office Action dated Oct. 8, 2014 for Application No. 201180011595.5 with English language translation.

Li, Martin K.S. et al., "Synthesis of exfoliated CNT-metal-clay nanocomposite by chemical vapor deposition", Separation and Purification Technology, vol. 67, 2009, pp. 238-243.

* cited by examiner

αs-Plot
ADSORBATE N2
ADSORPTION TEMPERATURE 77[K]

METHOD FOR PRODUCING ALIGNED CARBON NANOTUBE AGGREGATE

TECHNICAL FIELD

The present invention relates to a method for producing a carbon nanotube. More specifically, the present invention relates to a method for producing a carbon nanotube, which method is capable of producing a carbon nanotube or an aligned carbon nanotube aggregate by chemical vapor deposition (CVD) and also is capable of mass-producing a carbon nanotube whose quality is stable over long periods of time.

BACKGROUND ART

A carbon nanotube (hereinafter may be referred to as "CNT") is a carbon structure such that a carbon sheet, which is constituted by carbon atoms arranged two-dimensionally in the form of hexagons, is closed to form a cylindrical shape. The CNT may consist of multiple walls or of a single wall. Because of their mechanical strength, optical characteristics, electrical characteristics, thermal characteristics and molecular adsorption capacity etc., both of such CNTs show promise as functional materials such as an electronic device material, an optical element material and an electrically conducting material. Out of the CNTs, in particular a single-wall CNT has been attracting attention as a material for a nano-electronic device, a nano-optical element or an energy storage device, because of its excellent characteristics such as excellent electrical characteristics (very high current density), excellent thermal characteristics (heat conductivity equivalent to diamonds), excellent optical characteristics (light emitting property in a wavelength range for optical communication), excellent hydrogen storage property and an excellent metal catalyst supporting property etc. as well as its characteristics of both semiconductor and metal.

In order to make good use of CNTs for such purposes, it is desirable that a plurality of CNTs be each aligned in a specific direction and gathered to form an aggregate in the form of a bundle, a film or a block, and that such a CNT aggregate deliver their functions such as electrical, electronic and optical functions. A CNT is a material that has a one-dimensional structure with very high aspect ratio, and thus its function shows high directivity. Therefore, arranging CNTs constituting a CNT aggregate (structure) such that they are each aligned in a specific direction makes it possible to cause functions thereof to have the same directivity. This makes it possible to obtain a high-performance CNT aggregate.

That is, an aligned CNT aggregate in which the CNTs are each aligned in a specific direction shows high directivity of transmission characteristics, i.e., its transmission characteristic in the specific direction is high, as compared to a CNT aggregate in which CNTs are each randomly oriented, i.e., a non-aligned CNT. Because of such a high directivity, the CNT aggregate shows better electrical characteristics (e.g., higher electric conductivity), better mechanical characteristics (e.g., higher strength) and better thermal characteristics (e.g., higher heat conductivity). Further, such a characteristic of the CNT aggregate that differs between in the specific direction and in other directions, i.e., anisotropy of the CNT aggregate, is effective when for example heat is desired to be diffused or discharged selectively in a desired direction, and thus such a CNT aggregate is suitable for use as a heat conductive material etc. Further, the CNT aggregate is desirably larger in size such as height and length. It is expected that newly developing such an aligned CNT aggregate will dramatically increase the field of application of CNTs.

Meanwhile, there has been known chemical vapor deposition (hereinafter may be referred to as "CVD"), which is one of the methods of producing CNTs (refer to Patent Literatures 1 and 2 etc.). The CVD is characterized by bringing a carbon compound into contact with fine metal particles serving as a catalyst in a high temperature environment of approximately 500° C. to 1000° C. Since the CVD enables production of CNT under the conditions where the kind and arrangement of catalyst or the kind and reaction conditions of a carbon compound etc. are variously changed, the CVD has been attracting attention as being suitable for mass production of CNTs. Further, the CVD is advantageous in that (i) it is possible to produce both single-wall carbon nanotubes (SWCNT) and multiwall carbon nanotubes (MWCNT) and (ii) since a substrate on which a catalyst is supported is used, it is possible to produce a large number of CNTs aligned in a direction perpendicular to a surface of the substrate.

For example, Patent Literature 2 discloses a method of allowing CNTs to form on a silicon substrate by chemical vapor deposition in the presence of an oxidizer, which method is for industrial production of CNTs. This method aims at improving purity of CNTs, increasing specific surface area of CNTs and improving degree of alignment of CNTs.

CITATION LIST

Patent Literatures

Patent Literature 1
Japanese Patent Application Publication, Tokukai, No. 2003-171108 A (Publication Date: Jun. 17, 2003)
Patent Literature 2
Pamphlet of International Publication, No. 2006/011655 (Publication Date: Feb. 2, 2006)
Patent Literature 3
Pamphlet of International Publication, No. 2004/071654 (Publication Date: Aug. 26, 2004)

SUMMARY OF INVENTION

Technical Problem

Generally, the outer diameter and outer diameter distribution of CNTs depend on the diameter and diameter distribution of fine catalyst particles. In a case where the diameter of each catalyst particle is large, the outer diameter of a resulting CNT also becomes large. If this is the case, a multiwall CNT is likely to form, and thus the specific surface area of the CNT decreases. For example, the method described in Patent Literature 2 has the following problem. According to the method described in Patent Literature 2, the thicknesses of a catalyst support layer and of catalyst are controlled in a nanometer scale for the purpose of allowing an aligned single-wall CNT aggregate to form. If the thicknesses of the catalyst support layer and of the catalyst are not even, unevenness is likely to occur in sizes of fine catalyst particles. As a result, multiwall CNTs would form and thus the specific surface area thereof would decrease.

Patent Literature 3 describes a method of (i) applying, to a substrate, a solution obtained by dispersing or dissolving an organometallic salt of or an inorganic metal salt of a catalytic metal in a solvent and thereafter (ii) drying and baking the solution on the substrate, thereby allowing fine particles of catalytic metal oxide to form on the substrate. As described in Patent Literature 3, an organometallic salt of or an inorganic metal salt of a catalytic metal easily agglomerates when applied. This has been a cause of loss of evenness in the layer thickness of a catalyst formed by the application. In addition, the solution prepared by the method described in Patent Literature 3 cannot be controlled as to agglomeration and solation of its containing organometallic salt or inorganic metallic salt of the catalytic metal. This may cause unevenness in the thickness of a catalyst obtained after the solution is applied, and thus multiwall CNTs are likely to form. Moreover, also in a case where the solution is used or stored over long periods of time, the organometallic salt of or the inorganic metal salt of the catalytic metal in the solution gradually agglomerates. This makes it difficult to properly apply the solution, and precipitation appears in the solution and causes a change in concentration of the solution. As a result, it is not possible to obtain CNTs that have the same quality stably over long periods of time.

Further, an aligned single-wall CNT aggregate of Patent Literature 2 is constituted by a bundle of single-wall CNTs that are large in average outer diameter (equal to or larger than 2 nm) and in outer diameter distribution (half width is equal to or larger than 1 nm) but small in linearity (G/D ratio is equal to or lower than 50; A ratio of Raman G band (G) to Raman D band (D), which are observed by Raman spectroscopy. Raman G band is unique to CNTs, and Raman D band is derived from a defective). This makes it possible to obtain an aligned CNT aggregate in which CNTs are difficult to form a dense bundle and thus the specific surface area is large. In order to obtain such an aligned single-wall CNT aggregate, it is necessary to control the diameter and diameter distribution of the catalyst to optimum diameter and diameter distribution. Note, however, that a catalyst prepared by for example the method described in Patent Literature 3 generally has a diameter as small as 2 nm or less and is small in diameter distribution (half width is equal to or smaller than 1 nm). Because of such size of fine catalyst particles, CNTs having an outer diameter of 2 nm or less and having small diameter distribution will be formed. Accordingly, the CNTs form a dense bundle, and thus it is not possible to form an aligned single-wall CNT aggregate that has a large specific surface area.

In view of such circumstances, it is an object of the present invention to provide a method of producing an aligned CNT aggregate by (i) using application liquids for forming a catalyst support layer and a catalyst formation layer, which application liquids can be stored for long periods of time and (ii) forming a catalyst support layer and a catalyst formation layer each having an even layer thickness.

Solution to Problem

In order to attain the above object, a method of producing a carbon nanotube in accordance with the present invention includes the steps of: providing a catalyst support layer on a substrate by applying, to the substrate, a catalyst support layer coating agent obtained by dissolving in an organic solvent (i) an organometallic compound containing aluminum and/or a metal salt containing aluminum and (ii) a stabilizer for inhibiting a condensation polymerization reaction of the organometallic compound and the metal salt; providing a catalyst formation layer on the catalyst support layer by applying, to the catalyst support layer, a catalyst formation layer coating agent obtained by dissolving in an organic solvent (a) an organometallic compound containing iron and/or a metal salt containing iron and (b) a stabilizer for inhibiting a condensation polymerization reaction of the organometallic compound and the metal salt; and growing an aligned carbon nanotube aggregate on the substrate by chemical vapor deposition (CVD).

Advantageous Effects of Invention

The present invention makes it possible to carry out application so that resulting catalyst support layer and catalyst formation layer each have an even layer thickness in a nanometer scale. This makes it possible to prevent generation of large catalyst particles and thus possible to produce fine catalyst particles of a uniform size. As a result, it is possible to produce an aligned CNT aggregate having a large specific surface area. Further, even after long term use or long term storage of the application liquids (the catalyst support layer coating agent and the catalyst formation layer coating agent), it is possible to stably produce an aligned CNT aggregate of the same quality.

DESCRIPTION OF EMBODIMENTS

Aligned CNT Aggregate

Figure 1:
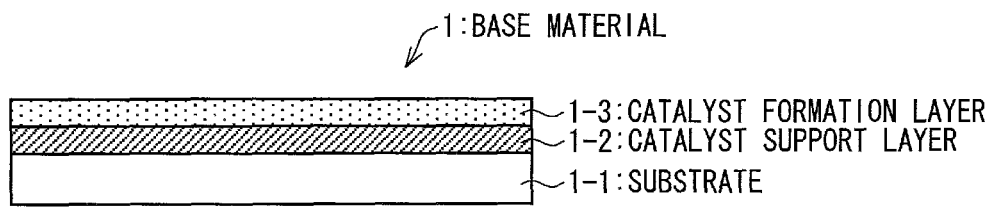
FIG. 1 is a view schematically illustrating layers constituting a base material for production of an aligned CNT aggregate in accordance with one embodiment of the present invention.

A method of producing an aligned carbon nanotube aggregate in accordance with the present invention (hereinafter, such a method is referred to as a "production method of the present invention" for short) makes it possible to grow CNTs on a base material with high efficiency. Such a large number of CNTs growing from catalyst are aligned in a specific direction to form an aligned CNT aggregate.

An aligned single-wall CNT aggregate obtained by the production method of the present invention has excellent characteristics that are not achieved by a conventional CNT aggregate. That is, the aligned single-wall CNT aggregate is characterized in that it is large in specific surface area, its CNTs are each aligned in a specific direction, and its bulk density is low. The aligned single-wall CNT aggregate has a specific surface area of as large as 600 m²/g to 2600 m²/g. The aligned single-wall CNT aggregate having such a large specific surface area is effective when used as a catalyst support or an energy/substance storage material, and thus is suitable for use in a supercapacitor and an actuator etc. Further, the CNTs constituting the aligned CNT aggregate are each aligned in a specific direction. This makes it possible to cause the functions of the CNTs to have the same directivity and thus possible to obtain a high-performance CNT aggregate.

Moreover, the aligned single-wall CNT aggregate has a weight density of as low as between 0.002 g/cm$^3$ and 0.2 g/cm$^3$. Such an aligned single-wall CNT aggregate grown on the substrate with low density is constituted by single-wall CNTs loosely associated with one another. Therefore, the aligned single-wall CNT aggregate removed from the substrate is easy to disperse uniformly in a solvent etc. In addition, the aligned single-wall CNT of the present invention thus appropriately aligned and having a low density is such that its density is easy to control by the aftertreatment step after formation thereof. Subjecting the aligned single-wall CNT aggregate to the densification step makes it possible to closely pack adjacent CNTs with high density as if they were a straw bag constituted by a bundle of straws. In this case, controlling the densification step makes it possible to obtain aligned single-wall CNT aggregates of various shapes.

Note here that CNTs show promise as filler that imparts high electric conductivity or high heat conductivity etc. to resin or ceramics etc. In order to efficiently make use of the high electric conductivity and the heat conductivity of the CNTs, it is important that each of the CNTs be long and be uniformly dispersed. However, CNTs have a strong bundle structure due to π-π interaction, and therefore are very difficult to disperse. In addition, since each CNT small in diameter has a large surface area and large surface energy, the CNTs agglomerate due to the forces which work to pull each other to reduce the surface energy. Such CNTs are very difficult to disperse. Depending on the purpose, it may be desirable that an aligned CNT aggregate having better dispersibility be used. Although it is difficult for conventional techniques to meet such demands and there is room for further improvement, the present invention is capable of producing an aligned CNT aggregate that has excellent dispersibility.

(Degree of Alignment)

An aligned single-wall CNT aggregate obtained by the present invention has for example a Herman's orientation factor of not less than −0.5 but not greater than 1, preferably greater than 0 but not greater than 1, and more preferably not less than 0.25 but not greater than 1. The Herman's orientation factor is calculated based on (i) X-ray diffraction intensity measured by a θ-2θ method or a Laue method and (ii) intensity profile obtained from an image obtained by fast Fourier transform of an SEM image or an atomic force microscope (also called "AMF") image. Details of how to evaluate degree of alignment will be described later. The aligned single-wall CNT aggregate having a Herman's orientation factor falling within the above range shows good electric characteristics, good mechanical characteristics and good thermal characteristics, and also is large in specific surface area, well-integrated and is easy to shape. In addition, such an aligned single-wall CNT aggregate shows sufficient thermodynamic, electric and mechanical anisotropies, and is thus suitable for various applications.

On the other hand, an aligned single-wall CNT aggregate having a Herman's orientation factor of less than 0 does not show any degree of alignment. Further, an aligned single-wall CNT aggregate having a Herman's orientation factor of less than 0.25 is such that each CNT is inclined at 45°, and thus alignment thereof is not so effective. Note here that an aligned single-wall CNT aggregate having a Herman's orientation factor of 1 is completely aligned.

In order for an aligned single-wall CNT aggregate to show a degree of alignment and have high specific surface area, it is preferable that the height (length) of the aligned single-wall CNT aggregate be not less than 10 μm but not greater than 10 cm. An aligned single-wall CNT aggregate having a height falling within the above range shows good degree of alignment and has a large specific surface area. Since the height is not less than 10 μm, the degree of alignment is improved. Further, in a case where the height is not greater than 10 cm, it is possible to produce the aligned single-wall CNT aggregate within a short period of time. This makes it possible to prevent adhesion of carbonaceous impurities and thus possible to increase the specific surface area. Moreover, the aligned single-wall CNT aggregate having a height falling within the above range is well-integrated, is easy to handle and is easy to shape.

An aligned CNT aggregate can be evaluated as being aligned by for example at least one of the following methods 1 to 3.

1. In a case where the aligned CNT aggregate is irradiated with X rays from a first direction parallel with the longitudinal direction of the CNTs and from a second direction perpendicular to the first direction, and an x-ray diffraction intensity of the aligned CNT aggregate is then measured (by 0-2θ method), a θ angle and a reflection direction where a reflection intensity from the second direction is greater than that from the first direction are obtained. Further, a θ angle and a reflection direction where the reflection intensity from the first direction is greater than that from the second direction are obtained.

2. In a case where an X-ray diffraction intensity is measured from a two-dimensionally diffraction pattern image obtained by irradiating the aligned CNT aggregate with X rays from the direction perpendicular to the longitudinal direction of the CNTs (Laue method), a diffraction peak pattern indicating presence of anisotropy appears.

3. A Herman's orientation factor calculated on the basis of the X-ray diffraction intensity obtained by θ-2θ method or Laue method is more than 0 but less than 1, preferably not less than 0.25 but not more than 1.

According to the X-ray diffraction method, (i) diffraction intensities of a (CP) diffraction peak and a (002) peak based on packing between the single-walled CNTs, and (ii) a diffraction peak intensity in a direction of X-rays that enter parallel and perpendicular to (100) and (110) peaks based on a six-membered carbon ring constituting the single-walled CNTs are different from each other.

(Substrate)

The substrate can be any substrate provided that it can support on its surface a catalyst for CNTs, and is preferably capable of keeping its shape even at high temperatures equal to and higher than 400° C. For example, a substrate with which it is possible to produce CNTs can be used as appropriate. Examples of a material for the substrate include: metals such as iron, nickel, chromium, molybdenum, tungsten, titanium, aluminum, manganese, cobalt, copper, silver, gold, platinum, niobium, tantalum, lead, zinc, gallium, indium, germanium, and antimony; alloys and metal oxides containing these metals; and nonmetals such as silicon, quartz, glass, mica, graphite, and diamond; and ceramics. Metals are more preferable than silicon and ceramics because metals are available at low cost. In particular, Fe—Cr (iron-chromium) alloy, Fe—Ni (iron-nickel) alloy, and Fe—Cr—Ni (iron-chromium-nickel) alloy etc. are suitable.

The substrate may be in the form of for example a thin layer, a block or a powder etc., as well as a flat plate. In particular, it is advantageous in mass-producing CNT aggregates that the substrate be in such a form that can achieve a large surface area for its volume.

In a case of using a substrate in the form of a flat plate, there is no particular limitation on the thickness of the substrate. For example, it is possible to use a substrate approximately several micrometers (thin layer) to approximately several centimeters in thickness. It is preferable that the substrate have a thickness of not smaller than 0.05 mm but not larger than 3 mm. In a case where the thickness of the substrate is not larger than 3 mm, it is possible to sufficiently heat a base material in the CVD process, and thus possible to prevent insufficient growth of CNTs and to reduce the cost of the substrate. In a case where the thickness of the substrate is not smaller than 0.05 mm, the substrate is less likely to deform due to carburization and the substrate itself is difficult to warp, and thus is advantageous for transportation and reuse thereof. As used in this Description, carburization means that a substrate is impregnated with a carbon component.

There is no particular limitation on the shape and size of the substrate in the form of a flat plate. The shape of the substrate can be a rectangle or a square. Although there is no particular limitation on the length of each side of the substrate, it is desirable that the substrate have a larger size in view of mass production of CNTs.

(Catalyst Support Layer Coating Agent, Catalyst Support Layer)

The production method of the present invention includes the step of applying a catalyst support layer coating agent to a substrate to thereby provide a catalyst support layer on the substrate.

The catalyst support layer coating agent used in the production method of the present invention is prepared by dissolving, in an organic solvent, (i) at least one selected from the group consisting of organometallic compounds containing aluminum and metal salts containing aluminum and (ii) a stabilizer for inhibiting a condensation polymerization reaction of the organometallic compounds and the metal salts. Compounds that can be used as the organometallic compound, metal salt, stabilizer and organic solvent are described later.

The catalyst support layer coating agent used in the production method of the present invention forms a catalyst support layer on a substrate when applied to the substrate. The catalyst support layer coating agent may be heated after being applied. The catalyst support layer makes it easy to control the particle size of a catalyst that it supports, and makes fine catalyst particles less prone to sintering at high temperatures even if the fine catalyst particles are present at high density. Further, the catalyst support layer improves activity of the catalyst.

The moisture content of the catalyst support layer coating agent used in the production method of the present invention is preferably not more than 2.0% relative to the total amount of the coating agent. Since the moisture content is not more than 2.0%, it is possible to prevent agglomeration and solation of an organometallic compound and a metal salt in the coating agent. If the organometallic compound and the metal salt agglomerate or solate, large particles become likely to form in the liquid. This may cause a reduction in specific surface area of CNTs. In addition, a condensation polymerization reaction gradually proceeds, and it becomes difficult to keep a uniform sol state for long periods of time and to stably produce CNTs of the same quality.

The present invention makes it possible to provide a catalyst on a substrate by a coating method. This makes it possible to provide an aligned CNT aggregate that is capable of achieving a large area, excellent in scalability and is capable of reducing costs, as compared to a method of providing a thin metal layer with use of a sputtering apparatus.

(Organometallic Compound, Metal Salt)

According to the present invention, a catalyst support layer is formed from an organometallic compound and/or a metal salt. These compounds turn into a metal hydroxide or a metal oxide on the substrate when subjected to the heating step (described later). The organometallic compound and the metal salt preferably decompose by heat at a temperature of not lower than 50° C. but not higher than 350° C. In a case where the temperature of heat decomposition is not lower than 50° C., it is possible to maintain stability of the organometallic compound and the metal salt serving as the coating agent. In a case where the temperature of heat decomposition is not higher than 350° C., it is possible to carry out the heating step (described later) at a temperature best suited for CNT growth, because high temperatures are not necessary.

As to a metal that constitutes the organometallic compound and the metal salt for forming the catalyst support layer, the organometallic compound and the metal salt preferably contain aluminum because of the ability to dramatically improve growth of CNTs. Those containing aluminum are inferred to improve the action of a catalyst activation material.

In a case where the catalyst support layer coating agent contains aluminum, the catalyst support layer coating agent is for example in the form of an organometallic compound containing aluminum or a salt containing aluminum. In particular, an organic aluminum compound is preferable. This is because an organometallic compound containing aluminum originally contains carbon atoms, and thus it is possible to easily produce a base material in which aluminum atoms and carbon atoms are contained in a catalyst support layer. Note however that, even in a case where carbon atoms are to be contained in the catalyst support layer but a compound containing no carbon atoms such as a metal salt containing aluminum is used, it is only necessary to add carbon atoms to the catalyst support layer.

The organometallic compound containing aluminum is for example alkoxide. Examples of alkoxide include aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. These compounds can be used solely or a mixture of two or more compounds can be used. Other examples of the organometallic compound containing aluminum are complexes such as tris(acetylacetonate) aluminum (III).

Examples of the metal salt containing aluminum include: aluminum sulfate, aluminum chloride, aluminum nitrate, aluminum bromide, aluminum iodide, aluminum lactate, basic aluminum chloride, and basic aluminum nitrate.

Out of these, it is preferable to use aluminum alkoxide, because of its good wetting property to a metal substrate and its ability to achieve good growth of carbon nanotubes.

(Organic Solvent)

The organic solvent used in the catalyst support layer coating agent can be selected from various organic solvents such as alcohols, glycols, ketones, ethers, esters and hydrocarbons. Because of their ability to well dissolve the organometallic compound and the metal salt, an alcohol or a glycol is preferably used. These organic solvents may be used solely or a mixture of two or more organic solvents may be used.

Examples of alcohols include: methanol, ethanol, isopropyl alcohol, n-butanol, isobutanol, octanol, and n-propyl alcohol. Examples of glycols include: ethylene glycol, ethylene glycol monomethyl ether, ethylene glycol monoethyl ether, ethylene glycol mono n-propyl ether, ethylene glycol mono n-butyl ether, diethylene glycol monomethyl ether, diethylene glycol monoethyl ether, propylene glycol monomethyl ether, propylene glycol monoethyl ether, propylene glycol monobutyl ether, ethylene glycol monoethyl ether acetate, ethyleneglycol monomethyl ether acetate, propylene glycol monoethyl ether acetate, and propylene glycol monomethyl ether acetate. Out of the alcohols, methanol, ethanol and isopropyl alcohol etc. are preferable because of their handleability and stability over storage.

In a case where an organometallic compound or a metal salt to be used is difficult to dissolve in an alcohol or a glycol, another solvent such as a hydrocarbon can be used in combination.

(Stabilizer)

The stabilizer is not limited provided that it inhibits a condensation polymerization reaction of the organometallic compound and the metal salt, but is preferably at least one selected from the group consisting of β-diketones and alkanolamines. These compounds may be used solely or a mixture of two or more compounds may be used. By adding such a stabilizer, reactive groups that are active in causing a condensation polymerization reaction are capped with the stabilizer so that the condensation polymerization reaction does not proceed. This makes it possible to obtain a coating agent that hardly changes in viscosity even over long periods of time. Further, it is possible to control the degree of polymerization of an oxidized polymer. This makes it possible to obtain a coating agent which is stable even over long periods of time and in which no precipitation of a metal oxide due to high-molecular-weight particles having a large size occurs. Use of the catalyst support layer coating agent that remains the same over long periods of time makes it possible to stably produce CNTs of the same quality. Without a stabilizer, the quality of a resulting CNT may differ between for example when a solution is used immediately after preparation and when a solution is used after one-month storage.

According to the present invention, no large particles are generated in a liquid because (i) a condensation polymerization reaction does not proceed and thus solation does not proceed or (ii) solation can be controlled. This makes it possible to form a flat and even catalyst support layer. Further, it becomes possible to control particles of the catalyst to an optimum state.

Solation of the organometallic compound and the metal salt may impair evenness of the layer thickness of the catalyst support layer. If this is the case, the particles of a catalyst become large, and thus multiwall CNTs become likely to form. Since multiwall CNTs are small in specific space area, it becomes impossible to obtain an aligned CNT aggregate having a large specific surface area.

The inventors of the present invention have found that, by blending a stabilizer into a solution of an organometallic compound and/or a metal salt, it is possible to prevent agglomeration of the organometallic compound and the metal salt when the solution is applied to a substrate, and thus possible to form a catalyst support layer having an even layer thickness. The inventors of the present invention have found that the stabilizer has, as well as the above function, a function of improving a wetting property to a metal substrate and preventing the solution from being improperly applied due to repelling etc., and that it is possible to form a catalyst support layer having an even layer thickness.

Examples of a β-diketone used as the stabilizer include acetylacetone, methyl acetoacetate, ethyl acetoacetate, benzoylacetone, dibenzoylmethane, benzoyl trifluoroacetone, furoylacetone, and trifluoroacetylacetone. In particular, it is preferable to use acetylacetone or ethyl acetoacetate.

Examples of an alkanolamine used as the stabilizer include monoethanolamine, diethanolamine, triethanolamine, N-methyldiethanolamine, N-ethyldiethanolamine, N.N-dimethylamino ethanol, diisopropanolamine, and triisopropanolamine. In particular, it is preferable to use a secondary or tertiary alkanolamine because of the ability to improve a wetting property to a metal substrate and thus improve growth of CNTs.

The stabilizer preferably decomposes by heat or evaporates at a temperature of not lower than 50° C. but not higher than 350° C. In a case where the temperature of heat decomposition and the boiling point are not lower than 50° C., it is possible to maintain stability of the coating agent. In a case where the temperature of heat decomposition and the boiling point are not higher than 350° C., it is possible to carry out, in the optional heating step (described later), heating at a temperature best suited for CNT growth, and thus possible to improve productivity because high temperatures are not necessary. With the stabilizer that decomposes or boils at a temperature lower than that for the heating step (described later), it is possible to reduce the amount of a stabilizer that remains in a layer even after the heating step, and thus possible to prevent insufficient growth of CNTs.

The molar ratio of the stabilizer to the sum of the organometallic compound and the metal salt contained in the catalyst support layer coating agent is not particularly limited. When the ratio of the number of moles of the stabilizer to the total number of moles of the organometallic compound and the metal salt is not less than 0.01:1 but not more than 3.0:1, excellent effect can be achieved. In particular, it is preferable that the ratio of the number of moles of the stabilizer to the total number of moles of the organometallic compound and the metal salt be not less than 0.5:1 but not more than 1.5:1. In a case where the ratio of the number of moles of the stabilizer to the total number of moles of the organometallic compound and the metal salt is not less than 0.01:1, the stabilizer fully exerts its stabilization ability. In a case where the ratio of the number of moles of the stabilizer to the total number of moles of the organometallic compound and the metal salt is not more than 3.0:1, it is possible to prevent adverse effects such as whitening of a layer. By controlling the molar ratio of the stabilizer to the sum of the organometallic compound and the metal salt, it is possible to make sure that hydrolytic degradation and a condensation reaction of the organometallic compound and the metal salt do not occur before the heating step, and also possible to control hydrolytic degradation and a condensation reaction under the conditions for the subsequent heating step.

The total amount of the organometallic compound and the metal salt contained in the catalyst support layer coating agent is preferably not less than 0.5 wt % but not more than 10 wt %, and more preferably not less than 0.5 wt % but not more than 5 wt %, because the catalyst support layer coating agent containing such amounts of the organometallic compound and/or the metal salt will have a layer thickness with reduced unevenness and will be excellent in smoothness of its surface when applied.

The moisture content of the catalyst support layer coating agent relative to the total amount of the coating agent is preferably not more than 2.0%. Since the moisture content is not more than 2.0%, it is possible to prevent agglomeration and solation of the organometallic compound and the metal salt in the coating agent. If the organometallic compound and the metal salt agglomerate or solate, large particles become likely to form in a liquid. This may cause a reduction in specific surface area of CNTs. In addition, a condensation reaction gradually proceeds, and it becomes difficult to keep a uniform sol state for long periods of time and to stably produce carbon nanotubes of the same quality.

(Application)

By applying the catalyst support layer coating agent, a layer containing (i) the organometallic compound and/or the metal salt and (ii) the stabilizer is formed on a substrate. In this way, a catalyst support layer is obtained.

Moisture present in atmosphere may accelerate a condensation polymerization reaction of the organometallic compound and the metal salt. Therefore, it is important, in producing an even layer, to control temperatures and humidity levels during application and drying. The application and drying are carried out preferably at a temperature of not lower than 20° C. but not higher than 25° C. and at a relative humidity of not higher than 60%. In a case where the relative humidity is not higher than 60%, it is possible to inhibit a reaction of the organometallic compound and the metal salt with water vapor in atmosphere, and thus possible to form a layer with better evenness by application.

The coating agent may be applied to the surface of the substrate by any of the following methods: a method of application by spraying or brushing etc., spin coating, dip coating and the like.

(Heating Step)

The production method of the present invention may include, after the step of providing a catalyst support layer on a substrate by applying a catalyst support layer coating agent to the substrate, the heating step for heating the catalyst support layer provided on the substrate. Heating the catalyst support layer on the substrate initiates hydrolytic degradation and a condensation polymerization reaction of the organometallic compound and the metal salt, thereby forming a hardened layer containing a metal hydroxide and/or a metal oxide on the surface of the substrate.

In a case where the metal is aluminum, a thin aluminum hydroxide layer or a thin aluminum oxide layer is formed by heating. Since aluminum oxide (alumina) achieves good growth of CNTs, it is preferable to employ amorphous alumina. Alternatively, a transition alumina may be contained such as α-alumina, γ-alumina, δ-alumina, x-alumina, κ-alumina, θ-alumina or ρ-alumina.

The catalyst support layer coating agent is preferably dried after being applied, and is preferably further subjected to the heating step after the drying. By carrying out the heating step, a catalyst support layer containing a metal hydroxide and/or a metal oxide is formed. Further, adhesion between the substrate and the catalyst support layer is improved, and thus a catalyst formation layer coating agent can be applied with improved stability in the subsequent step.

The heating temperature is preferably not lower than 200° C. but not higher than 400° C., and further preferably not lower than 250° C. but not higher than 350° C. Although a temperature as high as between 500° C. and 1200° C. is needed usually to obtain a metal hydroxide or a metal oxide by baking, the baking according to the present invention is carried out at a lower temperature. Thus, the present invention is superior in productivity. Since the heating temperature is not higher than 400° C., an increase in crystallinity of a metal oxide layer is prevented. Further, it is possible to allow carbon atoms contained in the organometallic compound containing aluminum to remain in the catalyst support layer. This makes it possible to form a catalyst best suited to producing, by the production method of the present invention, an aligned CNT aggregate that has a large average outside diameter (equal to or larger than 2 nm) and has a large outside diameter distribution (half width is equal to or larger than 1 nm). If the metal oxide layer has high crystallinity, it is not possible to make optimum fine particles of a catalyst, and, in addition, the catalyst support layer and the catalyst may have reduced activity and thus cause a decrease in growth of CNTs. In a case of using a metal substrate, the heating temperature of not higher than 400° C. makes it possible to prevent oxidation of the surface of the substrate and thus possible to prevent a decrease in growth of CNTs.

Figure 3:
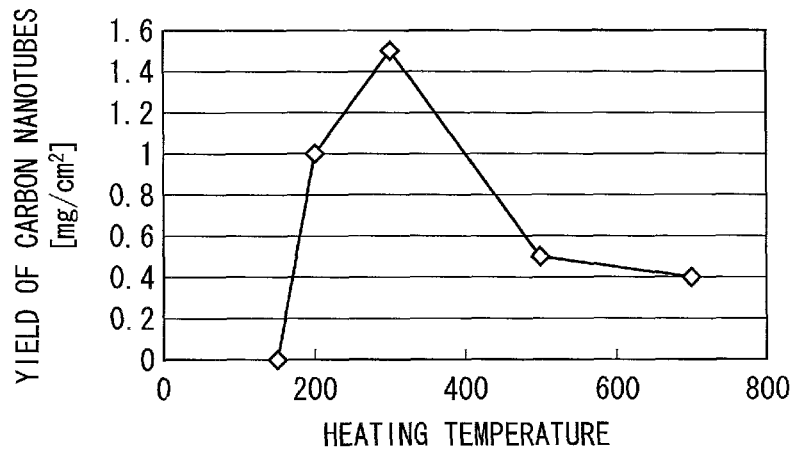
FIG. 3 is a diagram schematically showing a relationship between heating temperature for a catalyst support layer and yield of aligned CNT aggregates per unit area of a substrate.

The yield of CNTs synthesized with use of a catalyst support layer was measured while the temperature of heating after application of a catalyst support layer coating agent, from which the catalyst support layer was obtained, was changed from 200° C. to 700° C. FIG. 3 shows a relationship between the yield of CNTs per unit area of a substrate and the heating temperature. It was found that the heating temperature had a significant effect on growth of CNTs. The temperature of heating after application of the catalyst support layer coating agent is preferably not lower than 200° C. but not higher than 400° C., because growth of CNTs is stable at these temperatures.

The heating time is preferably as short as possible from the point of view of preventing an increase in crystallinity of the metal oxide layer, allowing carbon atoms in the organometallic compound containing aluminum to remain in the catalyst support layer, and increasing productivity. The heating time is preferably not less than 5 minutes but not more than 3 hours. The maximum length of the heating time is more preferably 1 hour, and further preferably 30 minutes.

The catalyst support layer obtained after the heating step preferably has a layer thickness of not smaller than 10 nm but not larger than 100 nm. A catalyst support layer having a layer thickness falling within the above range can be easily formed uniformly without unevenness. In a case where the layer thickness is not larger than 100 nm, a catalyst support layer that is homogeneous and has no cracks can be easily formed. In a case where the layer thickness is not smaller than 10 nm, the catalyst support layer makes it easy to form CNTs.

The catalyst support layer preferably contains aluminum atoms and carbon atoms. The aluminum atoms contained in the catalyst support layer may be in any state. That is, an aluminum compound may be contained in the catalyst support layer or an aluminum metal itself may be contained in the catalyst support layer. It is preferable that the catalyst support layer contain an aluminum compound. For example, as described earlier, the following can be employed. That is, an organometallic compound containing aluminum is applied to a substrate and heated to form a catalyst support layer such that aluminum atoms derived from the organometallic compound containing aluminum are contained in the catalyst support layer.

Further, the carbon atoms contained in the catalyst support layer may be in any state. That is, a carbon compound may be contained in the catalyst support layer or allotropes of carbon may be contained in the catalyst support layer. For example, as described earlier, the following can be employed. That is, an organometallic compound containing aluminum is applied to a substrate and heated to form a catalyst support layer such that a carbon component will remain in the catalyst support layer, thereby carbon atoms are contained in the catalyst support layer.

The composition ratio of carbon atoms in the catalyst support layer as measured by elementary analysis using X-ray photoelectron spectroscopy (ESCA) is preferably not less than 8% but not more than 30%. The lower limit of the composition ratio of the carbon atoms is more preferably 10%, and further preferably 15%. The upper limit of the composition ratio of the carbon atoms is more preferably 25%, and further preferably 20%. In a case where the catalyst support layer contains carbon atoms in an amount falling within the above range, it is possible to obtain an aligned CNT aggregate that less agglomerates and is excellent in dispersibility. Further, a catalyst support layer containing carbon atoms in an amount not more than 30% is obtained for example by heating the organometallic compound containing aluminum such that the carbon atoms will remain. Therefore, such a catalyst support layer is advantageous in that it is low-cost because it can be produced from inexpensive materials with great productivity.

The catalyst support layer preferably further contains oxygen atoms. This may be achieved by for example applying an organometallic compound containing aluminum and oxygen atoms to a substrate and heating the organometallic compound to form a catalyst support layer such that the catalyst support layer thus formed contains oxygen atoms derived from the organometallic compound containing aluminum and oxygen atoms. That is, an arrangement may be employed in which an organometallic compound containing aluminum and oxygen atoms is heated to form alumina so that oxygen atoms in the alumina remain in the catalyst support layer.

In a case where the catalyst support layer contains oxygen atoms, the content of the oxygen atoms is preferably as follows. The composition ratio (O/Al) of the oxygen atoms to aluminum atoms measured by for example elementary analysis using X-ray photoelectron spectroscopy (ESCA) is more preferably not less than 1.8 but not more than 2.7. With a catalyst support layer containing oxygen atoms in an amount falling within the above range, it is possible to obtain an aligned CNT aggregate that less agglomerates and is excellent in dispersibility. Further, such a catalyst support layer is advantageous also in view of productivity, because the above composition ratio is easily achieved by controlling the heating conditions for the organometallic compound containing aluminum.

The catalyst support layer is preferably porous. The catalyst support layer is determined as porous if it has pores in its surface when observed under a scanning electron microscope (SEM). A catalyst support layer that is porous improves stability of CNT production. It is inferred that, although a mechanism is unknown, a catalyst activation material is adsorbed to pores in the surface of the catalyst support layer and thus becomes easy to be supplied to a catalyst, thereby the catalyst becomes difficult to lose its activity.

The catalyst support layer preferably has a BET specific surface area, as measured by a nitrogen adsorption method, of not less than 300 $m^2/g$. In a case where the BET specific surface area is not less than 300 $m^2/g$, it is possible to grow CNTs more efficiently. The BET specific surface area of the catalyst support layer can be controlled by the heating temperature and time to which the catalyst support layer coating agent is subjected after being applied. By controlling the heating temperature and time to the foregoing ranges, it is possible to efficiently obtain a catalyst support layer having a BET specific surface area of not less than 300 $m^2/g$. The upper limit of the BET specific surface area of the catalyst support layer is not particularly limited, but is preferably not more than 800 $m^2/g$.

Further, the catalyst support layer preferably has a smooth surface. With a catalyst support layer having a smooth surface, it is possible to prevent an increase in particle size of fine catalyst particles in the catalyst formation layer, and thus possible to obtain CNTs having a large specific surface area. The surface of the catalyst support layer preferably has an arithmetic mean surface roughness Ra of not greater than 0.05 μm.

(Catalyst Formation Layer Coating Agent, Catalyst Formation Layer)

The production method of the present invention includes the step of providing a catalyst formation layer on the catalyst support layer by applying a catalyst formation layer coating agent to the catalyst support layer.

The catalyst formation layer coating agent used in the production method of the present invention is obtained by dissolving, in an organic solvent, (i) at least one selected from the group consisting of organometallic compounds containing iron and metal salts containing iron and (ii) a stabilizer for inhibiting a condensation polymerization reaction of the organometallic compounds and the metal salts. Compounds usable as the organometallic compound, metal salt, stabilizer and organic solvent are described later.

The catalyst formation layer is formed on the catalyst support layer by applying, to the catalyst support layer on the substrate, a catalyst coating agent used in the production method of the present invention. The catalyst coating agent is preferably dried after being applied. Further, the catalyst formation layer thus formed is preferably subjected to the formation step (described later). This causes reduction of the catalyst formation layer so that the catalyst becomes fine particles and acts more suitably as a catalyst for formation of CNTs. The fine catalyst particles formed by the production method of the present invention have a wide diameter distribution, and are dense in some portions of the substrate and sparse in other portions of the substrate. It is inferred that this makes it possible to obtain CNTs having a wide outer diameter distribution and many inflection points. As such, it is possible to produce CNTs that are difficult to form a strong bundle and are excellent in dispersibility as compared to those obtained by conventional techniques.

CNTs show promise as filler that imparts high electric conductivity or high heat conductivity etc. to resin or ceramics etc. In order to efficiently make use of the high electric conductivity and the heat conductivity of the CNTs, it is important that each of the CNTs be long and be uniformly dispersed. However, CNTs have a strong bundle structure due to π-π interaction, and therefore are very difficult to disperse. In addition, since each CNT small in diameter has a large surface area and large surface energy, the CNTs agglomerate due to the forces which work to pull each other to reduce the surface energy. Such CNTs are very difficult to disperse. Depending on the purpose, it may be desirable that an aligned CNT aggregate having better dispersibility be used. However, it is difficult for conventional techniques to meet such demands and there is room for further improvement.

In this regard, the present invention makes it possible to produce an aligned CNT aggregate that has excellent dispersibility.

(Organometallic Compound, Metal Salt)

According to the present invention, a catalyst formation layer is formed from an organometallic compound and/or a metal salt. These compounds turn into a metal hydroxide or a metal oxide on the catalyst support layer when subjected to the heating step (described later). The organometallic compound and the metal salt preferably decompose by heat at a temperature of not lower than 50° C. but not higher than 350° C. In a case where the temperature of heat decomposition is not lower than 50° C., it is possible to maintain stability of the organometallic compound and the metal salt serving as the coating agent. In a case where the temperature of heat decomposition is not higher than 350° C., it is possible to carry out, in the heating step (described later), heating at a temperature best suited for CNT growth, and productivity is improved because high temperatures are not necessary.

As to a metal that constitutes the organometallic compound and the metal salt for forming the catalyst formation layer, the organometallic compound and the metal salt preferably contain iron because of the ability to dramatically improve growth of CNTs.

Examples of the organometallic compound containing iron include: iron pentacarbonyl, ferrocene, acetylacetone iron (II), acetylacetone iron (III), trifluoroacetylacetone iron (II), and trifluoroacetylacetone iron (III).

Examples of the metal salt containing iron include: inorganic acid irons such as iron sulfate, iron nitrate, iron phosphate, iron chloride, and iron bromide; and iron salts of organic acid such as iron acetate, iron oxalate, iron citrate and iron lactate. These compounds may be used solely or a mixture of two or more compounds may be used.

Out of those listed above, iron salts of organic acid are preferable because of their ability to achieve a good wetting property to a metal substrate and achieve good growth of carbon nanotubes.

(Organic Solvent)

The organic solvent can be selected from various organic solvents such as alcohols, glycols, ketones, ethers, esters and hydrocarbons. Because of their ability to well dissolve the organometallic compound and the metal salt, an alcohol or a glycol is preferably used. These organic solvents may be used solely or a mixture of two or more organic solvents may be used.

Examples of alcohols include: methanol, ethanol, isopropyl alcohol, n-butanol, isobutanol, octanol, and n-propyl alcohol. Examples of glycols include: ethylene glycol, ethylene glycol monomethyl ether, ethylene glycol monoethyl ether, ethylene glycol mono n-propyl ether, ethylene glycol mono n-butyl ether, diethylene glycol monomethyl ether, diethylene glycol monoethyl ether, propylene glycol monomethyl ether, propylene glycol monoethyl ether, propylene glycol monobutyl ether, ethylene glycol monoethyl ether acetate, ethyleneglycol monomethyl ether acetate, propylene glycol monoethyl ether acetate, and propylene glycol monomethyl ether acetate. Out of the alcohols, methanol, ethanol and isopropyl alcohol etc. are preferable because of their handleability and stability over storage.

(Stabilizer)

The stabilizer is not limited provided that it inhibits a condensation polymerization reaction of the organometallic compound and the metal salt, but is preferably at least one selected from the group consisting of β-diketones and alkanolamines. These compounds may be used solely or a mixture of two or more compounds may be used. By adding such a stabilizer, reactive groups that are active in causing a condensation polymerization reaction are capped with the stabilizer so that the condensation polymerization reaction does not proceed. This makes it possible to obtain a coating agent that hardly changes in viscosity even over long periods of time. Further, it is possible to control the degree of polymerization of an oxidized polymer. This makes it possible to obtain a coating agent which is stable even over long periods of time and in which no precipitation of a metal oxide due to high-molecular-weight particles having a large size occurs. Use of the catalyst formation layer coating agent that remains the same over long periods of time makes it possible to stably produce CNTs of the same quality. Without a stabilizer, the quality of a resulting CNT may differ between for example when a solution is used immediately after preparation and when a solution is used after one-month storage.

According to the present invention, no large particles are generated in a liquid because (i) a condensation polymerization reaction does not proceed and thus solation does not proceed or (ii) solation can be controlled. This makes it possible to form a flat and even catalyst formation layer. Further, it becomes possible to control particles of the catalyst to an optimum state.

Solation of the organometallic compound and the metal salt may impair evenness of the layer thickness of the catalyst. If this is the case, the particles of the catalyst become large, and thus multiwall CNTs become likely to form. Since multiwall CNTs are small in specific surface area, it becomes impossible to obtain an aligned CNT aggregate having a large specific surface area.

By blending a stabilizer into a solution of an organometallic compound and/or a metal salt, it is possible to prevent agglomeration of the organometallic compound and the metal salt when the solution is applied to the catalyst support layer, and thus possible to form a catalyst formation layer having an even layer thickness.

Examples of a β-diketone used as the stabilizer include acetylacetone, methyl acetoacetate, ethyl acetoacetate, benzoylacetone, dibenzoylmethane, benzoyl trifluoroacetone, furoylacetone, and trifluoroacetylacetone. In particular, it is preferable to use acetylacetone or ethyl acetoacetate.

Examples of an alkanolamine used as the stabilizer include monoethanolamine, diethanolamine, triethanolamine, N-methyldiethanolamine, N-ethyldiethanolamine, N.N-dimethylamino ethanol, diisopropanolamine, and triisopropanolamine. In particular, it is preferable to use a secondary or tertiary alkanolamine because of the ability to improve growth of carbon nanotubes.

The stabilizer preferably decomposes by heat or evaporates at a temperature of not lower than 50° C. but not higher than 350° C. In a case where the temperature of heat decomposition and the boiling point are not lower than 50° C., it is possible to maintain stability of the coating agent. In a case where the temperature of heat decomposition and the boiling point are not higher than 350° C., it is possible to carry out, in the optional heating step (described later), heating at a temperature most suitable for CNT growth, and thus possible to improve productivity because high temperatures are not necessary. With the stabilizer that decomposes or boils at a temperature lower than that for the heating step (described later), it is possible to reduce the amount of a stabilizer that remains in a layer even after the heating step, and thus possible to prevent insufficient growth of CNTs.

The molar ratio of the stabilizer to the sum of the organometallic compound and the metal salt contained in the catalyst formation layer coating agent is not particularly limited. When the ratio of the number of moles of the stabilizer to the total number of moles of the organometallic compound and the metal salt is not less than 0.01:1 but not more than 3.0:1, excellent effect can be achieved. In particular, it is preferable that the ratio of the number of moles of the stabilizer to the total number of moles of the organometallic compound and the metal salt be not less than 0.5:1 but not more than 1.5:1. In a case where the ratio of the number of moles of the stabilizer to the total number of moles of the organometallic compound and the metal salt is not less than 0.01:1, the stabilizer fully exerts its stabilization ability. In a case where the ratio of the number of moles of the stabilizer to the total number of moles of the organometallic compound and the metal salt is not more than 3.0:1, it is possible to prevent adverse effects such as whitening of a layer. By controlling the molar ratio of the stabilizer to the sum of the organometallic compound and the metal salt, it is possible to make sure that hydrolytic degradation and a condensation reaction of the organometallic compound and the metal salt do not occur before the heating step, and also possible to control hydrolytic degradation and a condensation reaction under the conditions for the subsequent heating step.

The total amount of the organometallic compound and the metal salt contained in the catalyst formation layer coating agent is preferably not less than 0.05 wt % but not more than 0.5 wt %, and more preferably not less than 0.1 wt % but not more than 0.5 wt %, because the catalyst formation layer coating agent containing such amounts of the organometallic compound and/or the metal salt will have a layer thickness with reduced unevenness and will be excellent in smoothness of its surface when applied.

(Application)

By applying a catalyst formation layer coating agent, a layer containing (i) an organometallic compound and/or a metal salt and (ii) a stabilizer is formed on a substrate. The layer is a catalyst formation layer.

Moisture present in atmosphere may accelerate a condensation polymerization reaction of the organometallic compound and the metal salt. Therefore, it is important, in producing an even layer, to control temperatures and humidity levels during application and drying. The application and drying are carried out preferably at a temperature of not lower than 20° C. but not higher than 25° C. and at a relative humidity of not higher than 60%. In a case where the relative humidity is not higher than 60%, it is possible to inhibit a reaction of the organometallic compound and the metal salt with water vapor in atmosphere, and thus possible to form a layer with better evenness by application.

The moisture content of the catalyst formation layer coating agent is preferably not more than 2.0% relative to the total amount of the coating agent. Since the moisture content is not more than 2.0%, it is possible to prevent agglomeration and solation of an organometallic compound and a metal salt in the coating agent. If the organometallic compound and the metal salt agglomerate or solate, large particles become likely to form in the liquid. This may cause a reduction in specific surface area of CNTs. In addition, a condensation reaction gradually proceeds, and it becomes difficult to keep a uniform sol state for long periods of time and to stably produce CNTs of the same quality.

The coating agent may be applied to the surface of the substrate by any of the following methods: a method of application by spraying or brushing etc., spin coating, dip coating and the like.

(Heating Step)

The catalyst formation layer is preferably subjected to the heating step so that the organic solvent remaining in the layer is removed. The heating temperature is preferably not lower than 50° C. but not higher than 200° C. Since the heating temperature is as low as 200° C. or lower, hydrolysis and a condensation polymerization reaction of the catalyst formation layer do not have to initiate at this stage. The heating step for heating the catalyst formation layer before the formation step can be carried out at a temperature as low as 200° C. or lower. This achieves excellent productivity.

The heating time is preferably as short as possible from the point of view of preventing an increase in crystallinity of the metal oxide layer and increasing productivity. The heating time is preferably not less than 5 minutes but not more than 30 minutes.

The catalyst obtained after the heating step preferably has a layer thickness of not smaller than 1 nm but not larger than 10 nm, and more preferably not smaller than 2 nm but not larger than 6 nm. The layer thickness of not smaller than 2 nm but not larger than 6 nm makes it possible to obtain an aligned single-wall CNT aggregate.

(Formation Step)

The production method of the present invention preferably includes the formation step after the step of providing the catalyst formation layer on the catalyst support layer, more preferably after the heating step is carried out after the step of providing.

The formation step is a step of (i) placing a catalyst supported on the substrate in an environment including a reducing gas and (ii) heating the catalyst and/or the reducing gas. The formation step brings about at least one of the following effects: reduction of the catalyst; stimulation of the catalyst to become fine particles suitable for growth of CNTs; and improvement in activity of the catalyst. The temperature of the catalyst and/or the reducing gas in the formation step is preferably not lower than 400° C. but not higher than 1100° C. Further, the length of the time for which the formation step is carried out is preferably not less than 3 minutes but not more than 30 minutes, and more preferably not less than 3 minutes but not more than 8 minutes. In a case where the formation step is carried out for a period of time falling within the above range, coarse catalyst particles are prevented from forming, and thus generation of a multiwall carbon nanotube can be prevented. It is preferable in the formation step that hydrolysis and a condensation polymerization reaction of the catalyst formation layer initiate, a hardened layer containing a metal hydroxide and/or a metal oxide be formed on the surface of a substrate, and, at the same time as or after the formation of the hardened layer, reduction of the catalyst be caused and the catalyst become fine particles, which are main purposes of the formation step.

For example, in a case where a catalytic metal is iron, a thin iron hydroxide layer or a thin iron oxide layer is formed, and, at the same time as or after the formation of the thin layer, reduction occurs and fine particles of the catalytic metal are formed. These are fine iron particles. Further, in a case where a metal in the catalyst support layer is alumina and the catalytic metal is iron, a layer of the catalytic metal is reduced to fine particles, thereby a large number of nanometer-sized fine iron particles are formed on a layer of alumina. In this way, the catalyst is adjusted to be suitable for production of an aligned CNT aggregate.

(Reducing Gas)

The reducing gas generally means a gas that is in gaseous form at temperatures at which CNTs are grown and that has at least one of the following effects: reduction of the catalyst, stimulation of the catalyst to become fine particles suitable for growth of CNTs, and improvement in activity of the catalyst. The reducing gas can be any gas provided that it is possible to produce CNTs, but is typically a gas having a reducing property. Examples of such a gas include hydrogen gas, ammonia, water vapor and a mixture of these gases. Another example is a mixed gas obtained by mixing hydrogen gas with an inert gas such as helium gas, argon gas or nitrogen gas. The reducing gas is generally used in the formation step; however, may be used in the growing step as appropriate.

(Growing Step)

The production method of the present invention includes the step of growing an aligned carbon nanotube aggregate on a substrate by chemical vapor deposition (CVD) (hereinafter, such a step is also referred to as "growing step").

For example, the growing step may be carried out in the following manner. A base material in which a catalyst support layer and a catalyst formation layer are provided is placed in a CVD furnace, and an aligned CNT aggregate is allowed to grow on the substrate by CVD after a source gas for CNTs is supplied or while the source gas for CNTs is being supplied.

The source gas is not limited provided that it is a substance serving as a material for CNTs, and is for example a gas having a material carbon source at temperatures at which CNTs grow. In particular, hydrocarbons such as methane, ethane, ethylene, propane, butane, pentane, hexane, heptane propylene and acetylene are suitable. Other examples are lower alcohols such as methanol and ethanol. A mixture of those listed above may be used. Further, the source gas may be diluted with an inert gas.

The inert gas is not limited provided that the inert gas is inert at the temperatures at which CNTs grow, does not cause a reduction in activity of the catalyst, and does not react with growing CNTs. For example, an inert gas that is usable in producing CNTs may be used as appropriate. Examples of such an inert gas include helium, argon, nitrogen, neon and krypton, and a mixed gas obtained by mixing any of these gases. In particular, nitrogen, helium, argon and a mixed gas obtained by mixing any of these gases are suitable.

When heating the source gas and/or the base material for production of an aligned CNT aggregate, it is more preferable to heat both of them. The heating temperature is not limited provided that CNTs can grow at that temperature, but is preferably not lower than 400° C. but not higher than 1100° C. The heating temperature of not lower than 400° C. makes the effect of a catalyst activation material (described later) more apparent, while the heating temperature of not higher than 1100° C. is capable of inhibiting a reaction of the catalyst activation material with CNTs.

(Catalyst Activation Material)

It is preferable, in the step of growing CNTs, to allow a catalyst activation material to be present in an atmosphere where a CNT growth reaction is carried out. Adding a catalyst activation material makes it possible to further improve production efficiency and purity of carbon nanotubes. The catalyst activation material is preferably for example a substance containing oxygen and causing no significant damage on CNTs at temperatures at which the CNTs grow. Examples of an effective catalyst activation material, as well as water vapor, include: hydrogen sulfide; oxygen; ozone; acid gas; nitrogen oxide; oxygen-containing compounds having a small number of carbons such as carbon monoxide and carbon dioxide; alcohols such as ethanol and methanol; ethers such as tetrahydrofuran; ketones such as acetone; aldehydes; esters; nitrogen oxide; and a mixture thereof. Out of those listed above, water vapor, oxygen, carbon dioxide, carbon monoxide, and ethers are preferable, and water vapor is particularly suitable.

The amount of the catalyst activation material to be added is not particularly limited, and for example may be a very small amount. In a case where the catalyst activation material is water vapor, the amount of water vapor to be added may be preferably not less than 10 ppm but not more than 10000 ppm, more preferably not less than 50 ppm but not more than 1000 ppm, and further preferably not less than 200 ppm but not more than 700 ppm.

At present, it is inferred that the catalyst activation material acts by the following mechanism. While CNTs are growing, if by-products such as amorphous carbon and graphite etc. adhere to a catalyst, the catalyst loses its activity and growth of the CNTs is inhibited. Under such circumstances, the catalyst activation material oxidizes the amorphous carbon and graphite etc. to gaseous carbon monoxide or carbon dioxide etc., thereby improving cleanliness of the catalyst layer. In this way, the catalyst activation material exerts its effect of increasing activity of the catalyst and extending the life of the activity of the catalyst (catalyst activating effect).

Since the addition of the catalyst activation material improves the activity of the catalyst and extends the life of the catalyst, the CNTs, which stop growing within as short as about 2 minutes according to conventional techniques, keep growing over several tens of minutes. In addition, the growth rate of the CNTs is 100 times to some 1000 times as great as that achieved by conventional techniques. Accordingly, it is possible to obtain an aligned CNT aggregate having a dramatically increased height.

EXAMPLES

The following description discusses, in detail, the production method of the present invention and an aligned CNT aggregate obtained by the production method, based on specific examples.

(Measurement of Specific Surface Area)

Specific surface area is a value obtained from an adsorption and desorption isotherm of liquid nitrogen measured at 77K by a Brunauer, Emmett and Teller method. The specific surface area was measured with use of a specific surface area measurement apparatus (Belsorp mini II, produced by BEL Japan).

(G/D Ratio)

G/D ratio is an indicator generally used to evaluate the quality of a CNT. The Raman spectrum of a CNT measured by Raman spectroscopy shows a vibration mode called G band (around 1600 cm$^{-1}$) and a vibration mode called D band (around 1350 cm$^{-1}$). The G band is a vibration mode attributed to a hexagonal lattice structure of graphite on the cylindrical surface of a CNT, whereas D band is a vibration mode attributed to an amorphous portion of the CNT. That is, a CNT having a higher peak intensity ratio (G/D ratio) of G band to D band is evaluated as having higher crystallinity.

In the examples of the present invention, the G/D ratio was found with use of microscopic laser Raman system (Nicolet Almega XR, produced by Thermo Fisher Scientific K.K.) by (i) peeling off part of an aligned CNT aggregate in the vicinity of the center of a base material and (ii) measuring the Raman spectrum by irradiating with a laser the surface of the aligned CNT aggregates peeled off from the base material.

(Average Outer Diameter of CNT)

Average outer diameter was found by (i) observing CNTs under a transmission electron microscope to obtain an image and (ii) measuring the outer diameters of fifty CNTs in the image to find an arithmetic mean value. The arithmetic mean value was used as the average outer diameter.

(Carbon Purity)

Carbon purity was measured with use of a thermogravimetric analyzer (TG) in the following manner. The temperature of a CNT was raised to 800° C. at 1° C./min in air, and the carbon purity (%) of the CNT was calculated from (Weight lost due to burning before 800° C. is reached/Initial weight)× 100.

(X-Ray Photoelectron Spectroscopy)

A catalyst support layer was analyzed by X-ray photoelectron spectroscopy (ESCA) with use of AXIS-ULTRA DVD produced by Shimadzu Corporation and a monochrome AlKα serving as an X-ray source. Emission current was 10 mA and anode applied voltage was 15 kV. A region at a $SiO_2$-equivalent depth of 5 nm or greater from the outermost surface of a layer was analyzed. Etching was carried out by argon sputtering at an etching rate of 40 nm/min ($SiO_2$ equivalent).

(Scanning Electron Microscopy)

Pores of a catalyst support layer were observed with use of an ultra-low-accelerating voltage SEM (ULTRA55, produced by ZEISS).

(Arithmetic Mean Surface Roughness)

Arithmetic mean surface roughness Ra was measured with use of a laser microscope (VK-9700, produced by KEYENCE CORPORATION.) at a 50-fold magnification.

(Density of Fine Catalyst Particles)

A 100-nm square region was selected from an image under the SEM, and the number of fine catalyst particles in that region was counted. The obtained number of catalyst particles per 100-nm square was multiplied by $10^{10}$ to convert into the number of catalyst particles per 1 cm$^2$. The same operation was carried out with respect to five regions, and arithmetic mean thereof was used as the density of fine catalyst particles.

Example 1

FIG. 1 shows a base material produced by the following production method. The base material 1 is constituted by a substrate 1-1, a catalyst support layer 1-2 provided on the substrate 1-1, and a catalyst formation layer 1-3 provided on the catalyst support layer.

1.85 g of aluminum tri-sec-butoxide (produced by Wako Pure Chemical Industries, Ltd.) was put in a 200-ml beaker, and 100 g of ethanol was added so as to dissolve the aluminum tri-sec-butoxide. Further, 1.12 g of triethanolamine (produced by Wako Pure Chemical Industries, Ltd.) serving as a stabilizer was added and dissolved in the mixture. In this way, a catalyst support layer coating agent was prepared.

288 mg of iron lactate trihydrate (produced by Wako Pure Chemical Industries, Ltd.) was put in a 200-ml beaker, and 100 g of ethanol was added so as to dissolve the iron lactate trihydrate. Further, 149 mg of triethanolamine serving as a stabilizer was added and dissolved in the mixture. In this way, a catalyst formation layer coating agent was prepared.

A Fe—Ni—Cr alloy YEF426 (produced by Hitachi Metals, Ltd., Ni: 42%, Cr: 6%) having a size of 40 mm×40 mm×0.3 mm was used as a substrate. The arithmetic mean surface roughness Ra of the substrate was measured with use of a laser microscope, and found to be approximately 0.24 μm.

The aforementioned catalyst support layer coating agent was applied to the substrate by spin coating under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 300° C. for 30 minutes, and thereafter cooled to room temperature. In this way, a catalyst support layer 30 nm in layer thickness was formed on the substrate.

The catalyst support layer thus obtained was subjected to X-ray photoelectron spectroscopy, and found to contain C, N, O and Al. The composition ratio of C was 16%, and the O/Al element ratio was 2.0. The result showed that carbon atoms derived from aluminum tri-sec-butoxide and/or triethanolamine, from which the catalyst support layer was made, remained in the layer, and that the catalyst support layer did not have a composition of general aluminum oxide (i.e., O/Al=1.5).

The aforementioned catalyst formation layer coating agent was applied to the catalyst support layer on the substrate under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 100° C. for 30 minutes, and thereafter cooled to room temperature. In this way, a catalyst formation layer 3 nm in layer thickness was formed. This completed the base material 1 shown in FIG. 1.

The base material thus obtained was placed in a reactor of a CVD apparatus (FIG. 2) in which the temperature inside was kept at 750° C. and pressure inside was kept at 1.02E+5 Pa, and helium and hydrogen were introduced into the reactor at 100 sccm and 900 sccm, respectively, for 6 minutes. This caused a reduction of the catalyst constituted by iron oxide and stimulated the catalyst to become fine particles suited for growth of single-wall CNTs, thereby a lot of nanometer-sized fine iron particles were formed on an alumina layer (this process is the formation step). In this step, the density of the fine iron particles (density of fine catalyst particles) was controlled to be $7.8 \times 10^{11}$ particles/cm$^2$.

Next, helium, ethylene, and water-containing helium (relative humidity: 23%) were supplied at 850 sccm, 100 sccm and 50 sccm, respectively, for 5 minutes to the reactor where temperature inside was kept at 750° C. and pressure inside was kept at $1.02 \times 10^5$ Pa. This caused a single-wall CNT to grow from each of the fine iron particles (this process is the growing step).

After completion of the growing step, helium alone was supplied at 1000 sccm to the reactor so that a resource gas(es) and a catalyst activation material(s) remaining in the reactor were removed (this process is the flushing step). In this way, an aligned single-wall CNT aggregate was obtained.

The aligned single-wall CNT aggregate thus obtained had the following characteristics: production amount was 1.4 mg/cm$^2$, G/D ratio was 5.0, density was 0.03 g/cm$^3$, BET specific surface area was 1100 m$^2$/g, CNT outer diameter was 0.8 nm to 8.0 nm, CNT average outer diameter was 2.8 nm, and carbon purity was 99.9%.

The catalyst support layer coating agent and the catalyst formation layer coating agent were stored in atmosphere at room temperature for 1 month, and thereafter applied to the substrate under the same conditions as those described above to form a catalyst support layer and a catalyst formation layer, respectively. Then, an aligned carbon nanotube aggregate was synthesized on this base material. A resultant aligned CNT aggregate had the same quality and characteristics as those of the aforementioned aligned CNT aggregate.

[Preparation and Evaluation of CNT Dispersion]

Figure 4:
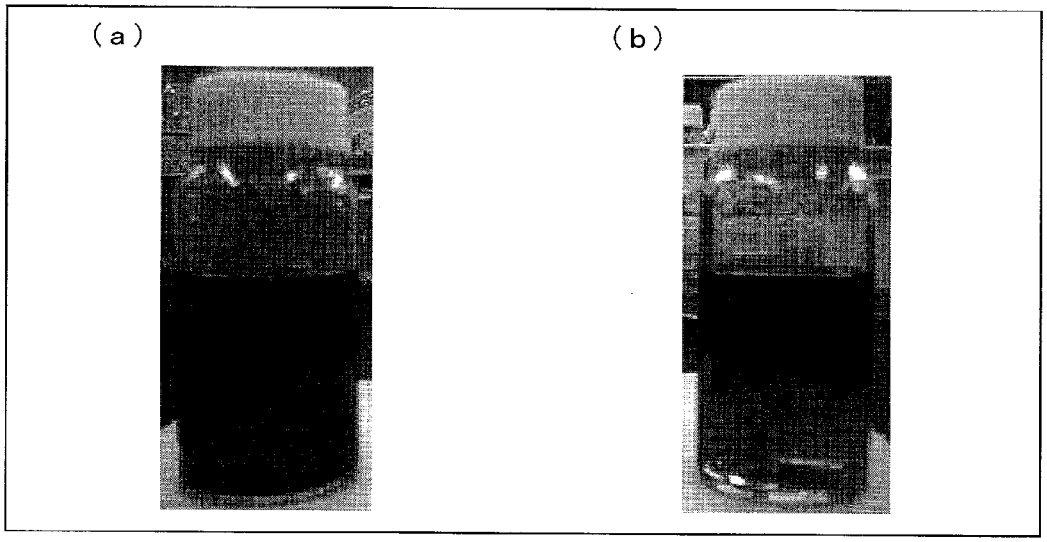
FIG. 4 is a view showing the results of tests on dispersibility of CNTs, in Example 1.

A carbon nanotube dispersion was prepared from carbon nanotubes obtained in Example 1, and the carbon nanotube dispersion thus prepared was evaluated. 4 mg of synthesized CNTs were added to 100 g of ethanol, and the mixture was stirred. In this way, a CNT mixed solution was prepared. Next, the mixed solution was subjected to ultrasonic irradiation with use of an ultrasonic irradiator (Ultrasonic Generator Model US-150, produced by NIHONSEIKI KAISHA LTD.) at 150 W and 120 μA for approximately 10 minutes. The mixed solution was cooled by iced water etc. as appropriate so that heat generation from the mixed liquid due to ultrasonic irradiation was suppressed and the mixed liquid was kept at a temperature of not higher than 40° C. After the ultrasonic irradiation, the mixed solution was allowed to stand for 10 minutes. (a) of FIG. 4 shows an image of the mixed solution. The dispersion prepared from the CNTs obtained in Example 1 was uniformly black and cloudy.

Meanwhile, 10 nm of aluminum oxide and 1.0 nm of iron were stacked on a substrate made of YEF426 with use of a sputtering apparatus to form a base material. CNTs were synthesized with use of this base material. A dispersion was prepared from the CNTs thus synthesized. As shown in (b) of FIG. 4, the dispersion separated into a solvent and the CNTs. This showed that the carbon nanotubes obtained in Example 1 were excellent in dispersibility in a solvent.

[Observation Under Transmission Electron Microscope]

Figure 5:
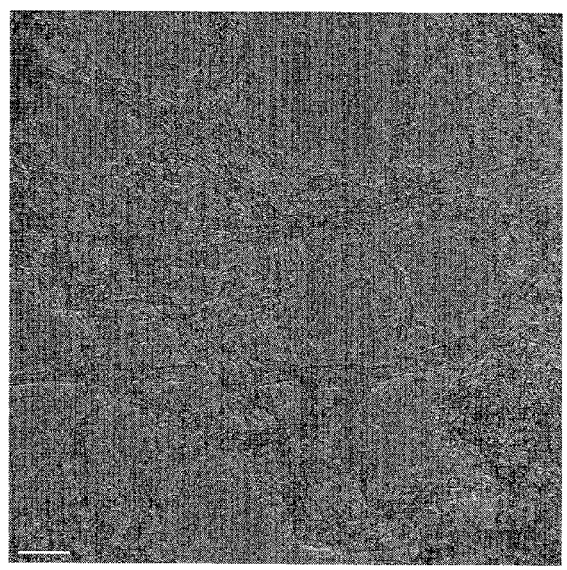
FIG. 5 is a view showing the result of observation of CNTs under a transmission electron microscope, in Example 1.

The carbon nanotube dispersion prepared from carbon nanotubes obtained in Example 1 was applied to a grid, and then dried and observed under a transmission electron microscope. The result is shown in FIG. 5. It was confirmed that obtained carbon nanotubes had a diameter distribution of not less than 0.8 nm but not more than 8 nm and had a lot of inflection points. It is inferred that the reason why the carbon nanotubes thus obtained are excellent in dispersibility is that the diameter distribution is wide and the number of inflection points is large.

Figure 6:
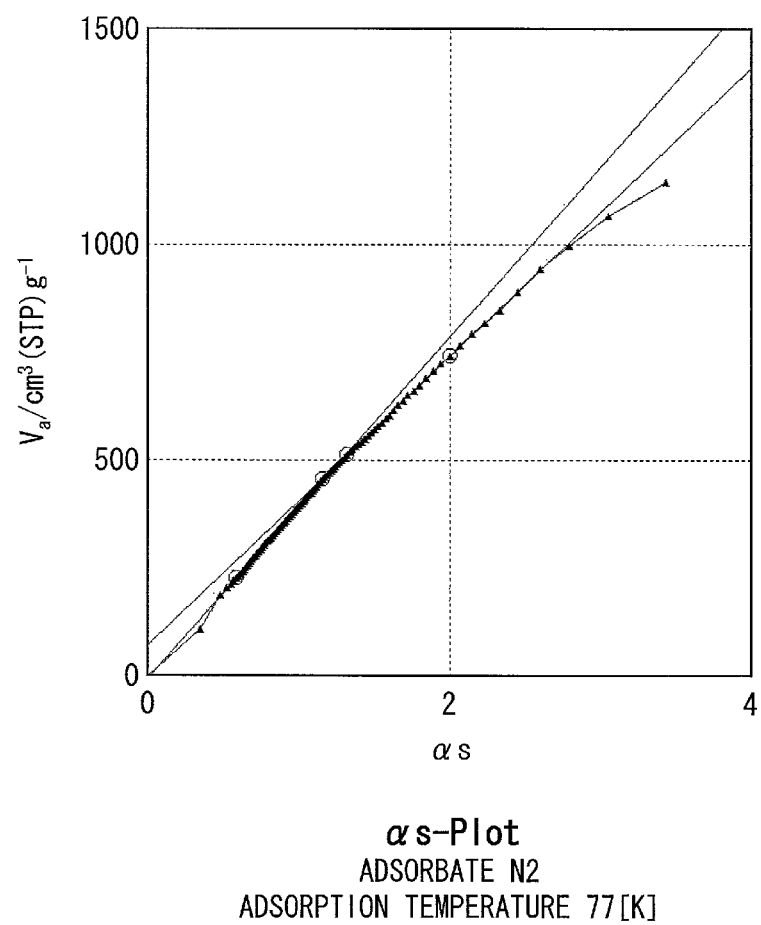
FIG. 6 is a diagram showing αs-plot for CNTs, in Example 1

FIG. 6 shows αs-plot for the carbon nanotubes obtained in Example 1. The carbon nanotubes have inflection points in a region where the value on the horizontal axis is 1.5 or less. This result shows that the carbon nanotubes are open and that gases have adsorbed also to the inside of the carbon nanotubes. As is clear from above, a carbon nanotube obtained by the production method of the present invention is characterized in that the tube has some defective portions with low crystallinity in for example inflection points of the tube, that a gas can adsorb also to the inside of the tube through the defective portions, and that the specific surface area of the tube is large.

Example 2

1.00 g of aluminum chloride (produced by Wako Pure Chemical Industries, Ltd.) was put in a 200-ml beaker, and 100 g of 2-propanol was added so as to dissolve the aluminum chloride. Further, 0.98 g of ethyl acetoacetate (produced by Wako Pure Chemical Industries, Ltd.) serving as a stabilizer was added and dissolved in the mixture. In this way, a catalyst support layer coating agent was prepared.

404 mg of iron nitrate (III) nonahydrate (produced by Wako Pure Chemical Industries, Ltd.) was put in a 200-ml beaker, and 100 g of ethanol was added so as to dissolve the iron nitrate (III) nonahydrate. Further, 149 mg of triethanolamine (produced by Wako Pure Chemical Industries, Ltd.) serving as a stabilizer was added and dissolved in the mixture. In this way, a catalyst formation layer coating agent was prepared.

A catalyst support layer and a catalyst formation layer were formed on a substrate under the same conditions as those for Example 1 with use of the aforementioned coating agents to form a base material. CVD was carried out under the same conditions as those for Example 1 with use of the base material, thereby obtaining a single-wall CNT aggregate aligned on the base material.

The aligned single-wall CNT aggregate thus obtained had the following characteristics: production amount was 1.0 mg/cm$^2$, G/D ratio was 5.0, density was 0.03 g/cm$^3$, BET specific surface area was 1000 m$^2$/g, CNT outer diameter was 0.8 nm to 8.0 nm, CNT average outer diameter was 2.8 nm, and carbon purity was 99.9%.

Example 3

1.9 g of aluminum tri-sec-butoxide was dissolved in 100 ml (78 g) of 2-propanol. Further, 0.9 g of triisopropanolamine serving as a stabilizer was added and dissolved in the mixture. In this way, a catalyst support layer coating agent was prepared.

Meanwhile, 174 mg of iron acetate was dissolved in 100 ml of 2-propanol. Further, 190 mg of triisopropanolamine serving as a stabilizer was added and dissolved in the mixture. In this way, a catalyst formation layer coating agent was prepared.

A Fe—Cr alloy SUS430 (produced by JFE Steel Corporation., Cr: 18%) having a size of 40 mm×100 mm×0.3 mm was used as a substrate. The arithmetic mean surface roughness Ra of the substrate was measured with use of a laser microscope, and found to be approximately 0.063 μm.

The aforementioned catalyst support layer coating agent was applied to the substrate by dip coating under the condition where room temperature was 25° C. and relative humidity was 50%. The application was carried out by (i) dipping the substrate in the catalyst support layer coating agent and then keeping the substrate in the catalyst support layer coating agent for 20 seconds and (ii) pulling up the substrate at a speed of 10 mm/sec. After that, the substrate was air-dried for 5 minutes.

Then, the substrate was heated in air of 300° C. for 30 minutes, and thereafter cooled to room temperature. In this way, a catalyst support layer 40 nm in layer thickness was formed on the substrate. The arithmetic mean surface roughness Ra of the catalyst support layer was 0.050 μm. The catalyst support layer thus obtained was subjected to X-ray photoelectron spectroscopy (ESCA), and found to contain C, N, O and Al. The composition ratio of C was 15%, and the O/Al element ratio was 1.8. The result showed that carbon atoms derived from aluminum tri-sec-butoxide and/or triisopropanolamine, from which the catalyst support layer was made, remained in the layer, and that the catalyst support layer did not have a composition of general aluminum oxide (i.e., O/Al=1.5).

Figure 9:
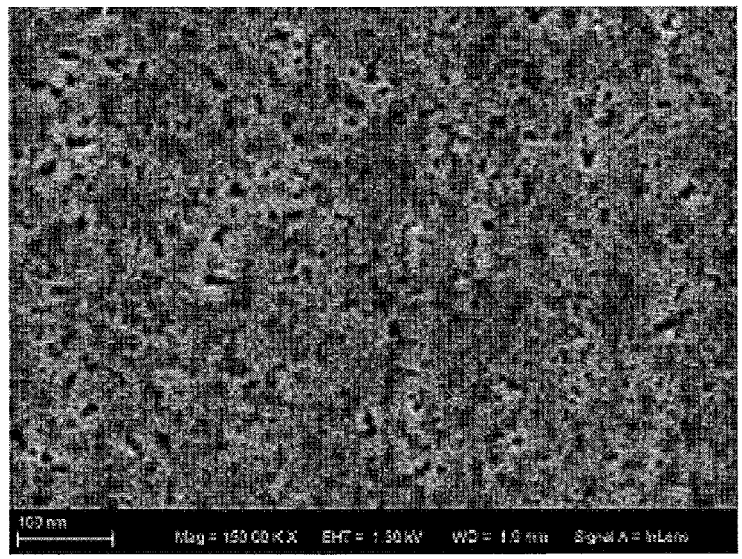
FIG. 9 is a view showing the result obtained by observing a surface of a catalyst support layer under an SEM, in Example 3.

The surface of the catalyst support layer thus obtained was observed under SEM. The result thereof is shown in FIG. 9. It was observed that the surface had pores (black spots in the image shown in FIG. 9), and confirmed that the catalyst support layer had a porous structure.

Then, the aforementioned catalyst formation layer coating agent was applied to the catalyst support layer on the substrate by dip coating under the condition where room temperature was 25° C. and relative humidity was 50%. The application was carried out by (i) dipping the substrate in the catalyst formation layer coating agent and then keeping the substrate in the catalyst formation layer coating agent for 20 seconds and (ii) pulling up the substrate at a speed of 3 mm/sec. After that, the substrate was air-dried for 5 minutes.

Then, the substrate was heated in air of 100° C. for 30 minutes, and thereafter cooled to room temperature. In this way, a catalyst formation layer 3 nm in layer thickness was formed.

Figure 10:
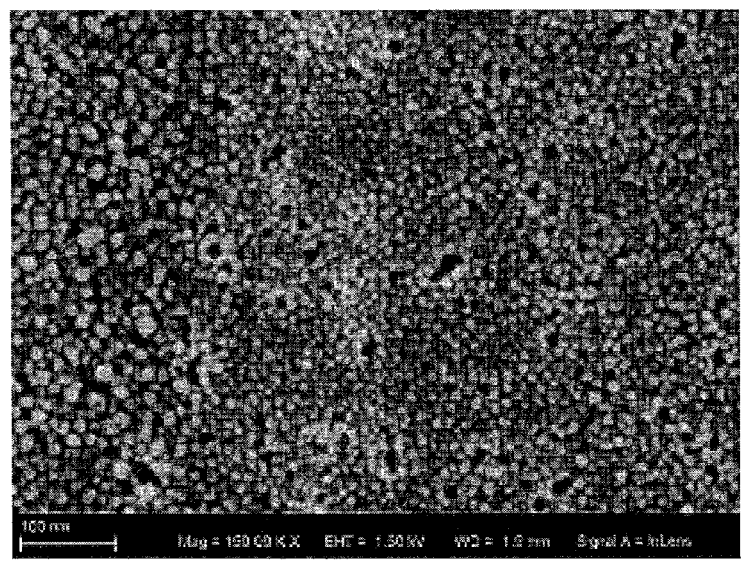
FIG. 10 is a view showing the result obtained by observing a surface of a catalyst formation layer under an SEM, in Example 3.

The formation step was carried out with use of this base material under the same conditions as those for Example 1. The surface of an obtained catalyst formation layer was observed under an SEM. The result thereof is shown in FIG. 10. It was confirmed that the catalyst formation layer had fine catalyst particles (white spots in the image shown in FIG. 10) formed on its surface.

Then, the growing step was carried out by CVD in the same manner as in Example 1 to obtain a single-wall CNT aggregate aligned on the substrate.

The aligned single-wall CNT aggregate thus obtained had the following characteristics: production amount was 1.4 mg/cm$^3$, G/D ratio was 4.0, density was 0.03 g/cm$^3$, BET specific surface area was 1100 m²/g, CNT outer diameter was 0.8 nm to 8.0 nm, CNT average outer diameter was 2.8 nm, and carbon purity was 99.9%.

Example 4

1.5 g of aluminum tri-iso-propoxide was dissolved in a solvent that was obtained by mixing 50 ml (39 g) of ethanol with 50 ml (34 g) of heptane. Further, 1.0 g of diisopropanolamine serving as a stabilizer was added and dissolved in the mixture. In this way, a catalyst support layer coating agent was prepared.

Meanwhile, 970 mg of a 50% mineral spirit solution of iron 2-ethylhexanoate (produced by Wako Pure Chemical Industries, Ltd.) was added and dissolved in 100 ml (88 g) of butyl acetate. Further, 130 mg of ethyl acetoacetate serving as a stabilizer was added and dissolved in the mixture. In this way, a catalyst formation layer coating agent was prepared.

A catalyst support layer was formed from the aforementioned coating agent on the substrate under the same conditions as those for Example 3. The catalyst support layer thus obtained was subjected to ESCA analysis, and found to contain C, N, O and Al. The composition ratio of C was 20%, and the O/Al element ratio was 2.3.

Then, a catalyst formation layer 3 nm in layer thickness was formed from the aforementioned coating agent on the catalyst support layer on the substrate under the same conditions as those for Example 3.

CVD was carried out under the same conditions as those for Example 1 with use of this base material to obtain an aligned single-wall CNT aggregate. The aligned single-wall CNT aggregate thus obtained had the following characteristics: production amount was 1.4 mg/cm², G/D ratio was 4.0, density was 0.03 g/cm³, BET specific surface area was 1100 m²/g, CNT outer diameter was 0.8 nm to 8.0 nm, CNT average outer diameter was 2.8 nm, and carbon purity was 99.9%.

[Preparation and Evaluation of CNT Dispersion]

Figure 7:
FIG. 7 is a view showing the result of a test on dispersibility of CNTs, in Example 3.

A carbon nanotube dispersion was prepared from carbon nanotubes obtained in each of Examples 3 and 4 in the same manner as in Example 1, and the carbon nanotube dispersion thus prepared was evaluated in the same manner as in Example 1. FIG. 7 shows an image of the sample of Example 3 which was obtained by being subjected to ultrasonic irradiation and thereafter allowed to stand for 10 minutes. The dispersion prepared from CNTs obtained in Example 3 was uniformly black and cloudy. The dispersion prepared from CNTs obtained in Example 4 was also uniformly black and cloudy.

[Observation Under Transmission Electron Microscope]

Figure 8:
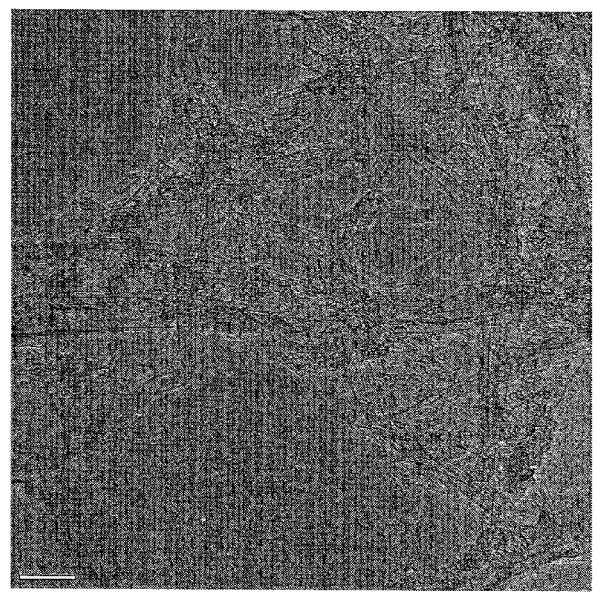
FIG. 8 is a view showing the result of observation of CNTs under a transmission electron microscope, in Example 3.

The CNT dispersion prepared from CNTs obtained in Example 3 was applied to a grid, and then dried and observed under a transmission electron microscope. The result is shown in FIG. 8. It was confirmed that obtained carbon nanotubes had a diameter distribution of 0.8 nm to 8 nm and had a lot of inflection points. It is inferred that the reason why the carbon nanotubes thus obtained are excellent in dispersibility is that the diameter distribution is wide and the number of inflection points is large.

Example 5

1.9 g of aluminum tri-sec-butoxide was dissolved in 100 ml (88 g) of n-butyl acetate. Further, 0.9 g of ethyl acetoacetate serving as a stabilizer was added and dissolved in the mixture. In this way, a catalyst support layer coating agent was prepared.

Meanwhile, 174 mg of iron acetate was dissolved in 100 ml (78 g) of 2-propanol. Further, 100 mg of acetylacetone serving as a stabilizer was added and dissolved in the mixture. In this way, a catalyst layer coating agent was prepared.

A catalyst support layer was formed from the aforementioned coating agent on a substrate under the same conditions as those for Example 3. The catalyst support layer thus obtained was subjected to ESCA analysis, and found to contain C, N, O and Al. The composition ratio of C was 12%, and the O/Al element ratio was 1.8.

Then, a catalyst formation layer 3 nm in layer thickness was formed from the aforementioned coating agent on the catalyst support layer on the substrate, under the same conditions as those for Example 3. CVD was carried out with use of this base material under the same conditions as those for Example 1 to obtain a single-wall CNT aggregate aligned on the substrate.

The aligned single-wall CNT aggregate thus obtained had the following characteristics: production amount was 1.5 mg/cm², G/D ratio was 5.0, density was 0.03 g/cm³, BET specific surface area was 1100 m²/g, CNT outer diameter was 0.8 nm to 8.0 nm, CNT average outer diameter was 2.8 nm, and carbon purity was 99.9%.

Comparative Example 1

1.85 g of aluminum tri-sec-butoxide (produced by Wako Pure Chemical Industries, Ltd.) was put in a 200-ml beaker, and 100 g of ethanol was added so as to dissolve the aluminum tri-sec-butoxide. Further, 0.2 g of pure water for acceleration of a hydrolysis reaction was added and dissolved in the mixture. In this way, a catalyst support layer coating agent was prepared.

404 mg of iron nitrate (III) nonahydrate (produced by Wako Pure Chemical Industries, Ltd.) was put in a 200-ml beaker, and 100 g of ethanol (E.P. reagent) was added so as to dissolve the iron nitrate (III) nonahydrate. In this way, a catalyst formation layer coating agent was prepared.

A Fe—Ni—Cr alloy YEF426 (produced by Hitachi Metals, Ltd., Ni: 42%, Cr: 6%) having a size of 40 mm×40 mm×0.3 mm was used as a substrate. The arithmetic mean surface roughness Ra of the substrate was measured with use of a laser microscope, and found to be approximately 0.24 μm.

The aforementioned catalyst support layer coating agent was applied to a substrate by spin coating under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 700° C. for 30 minutes, and thereafter cooled to room temperature. In this way, a catalyst support layer constituted by aluminum oxide was formed on the substrate.

The aforementioned catalyst coating agent was applied to the catalyst support layer on the substrate by spin coating under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 700° C. for 30 minutes, and thereafter cooled to room temperature. In this way, a catalyst formation layer constituted by iron oxide was formed on the substrate.

CVD was carried out under the same conditions as those for Example 1 with use of this base material to obtain an aligned CNT aggregate. The characteristics of the aligned CNT aggregate thus obtained depended on details of the production conditions. Typical characteristics were as follows: production amount was 0.4 mg/cm$^2$, G/D ratio was 3.0, density was 0.03 g/cm$^3$, and BET specific surface area was 580 m$^2$/g. The production amount was small and the BET specific surface area was also small.

The catalyst support layer coating agent and the catalyst formation layer coating agent were stored in atmosphere at room temperature for 1 month, and thereafter applied to the substrate under the same conditions as those described above to form a catalyst support layer and a catalyst formation layer, respectively. Then, an aligned carbon nanotube aggregate was synthesized on this base material. The characteristics of the aligned CNT aggregate thus obtained depended on details of the production conditions. Typical characteristics were as follows: production amount was 0.3 mg/cm$^2$, G/D ratio was 2.0, density was 0.03 g/cm$^3$, and BET specific surface area was 500 m$^2$/g. Both the production amount and the BET specific surface area were smaller than they were immediately after preparation of the coating agents. It is inferred that, since no stabilizer was blended in the coating agents, agglomeration or condensation polymerization reactions occurred in a liquid due to changes with time, large particles of metal oxide were generated, and thus multi-wall carbon nanotubes became likely to form.

Comparative Example 2

Alumina sol (aluminum sol-10D produced by Kawaken Fine Chemicals Co., Ltd., a 10% DMF solution of boehmite alumina) was diluted with DMF (dimethylformamide). In this way, a 3% alumina sol (DMF solution of boehmite alumina) was prepared.

1.52 g (3.75 mmol) of iron nitrate (III) nonahydrate was dissolved in approximately 40 ml of ethanol, and the obtained iron nitrate solution was put in a separating funnel. Approximately 200 ml of ethanol was put in a 300-ml conical flask, and was heated with an electric heater and brought into a boil. While the ethanol was being boiled, the iron nitrate solution was dropped into the ethanol at approximately 10 ml/min. After the entire iron nitrate solution was dropped into the ethanol, the conical flask was dipped in cold water and cooled until its temperature decreased to room temperature. Then, ethanol was added to the mixture so that the total volume was 250 ml. In this way, an iron oxide sol that had iron concentration of 15 mmol/l and that was transparent deep reddish brown was obtained.

A Fe—Ni—Cr alloy YEF426 (produced by Hitachi Metals, Ltd., Ni: 42%, Cr: 6%) having a size of 40 mm×40 mm×0.3 mm was used as a substrate. The arithmetic mean surface roughness Ra of the substrate was measured with use of a laser microscope, and found to be approximately 0.24 µm.

The aforementioned alumina sol was applied to the substrate by spin coating under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 700° C. for 30 minutes, and thereafter cooled to room temperature. In this way, a catalyst support layer constituted by aluminum oxide was formed on the substrate. The catalyst support layer was 110 nm in layer thickness and had an arithmetic mean surface roughness Ra of 0.20 µm.

The aforementioned iron oxide sol was applied to the catalyst support layer on the substrate by spin coating under the condition where room temperature was 25° C. and relative humidity was 50%. The application was carried out by (i) dropping 0.1 ml of a solution onto the substrate and thereafter (ii) rotating the substrate at 500 rpm for 10 seconds and then at 2000 rpm for 20 seconds. After that, the substrate was air-dried for 5 minutes.

Then, the substrate was heated in air of 700° C. for 30 minutes, and thereafter cooled to room temperature. In this way, a catalyst formation layer constituted by iron oxide was formed on the substrate.

CVD was carried out under the same conditions as those for Example 1 with use of this base material to obtain an aligned CNT aggregate. The characteristics of the aligned CNT aggregate thus obtained depended on details of the production conditions. Typical characteristics were as follows: production amount was 0.5 mg/cm$^2$, G/D ratio was 2.0, density was 0.03 g/cm$^3$, and BET specific surface area was 550 m$^2$/g. The production amount was small and the BET-specific surface area was also extremely small.

[Production Apparatus]

A production apparatus for use in synthesis of an aligned carbon nanotube aggregate of the present invention essentially includes (i) a synthesis furnace (reaction chamber) for containing a catalyst and a substrate supporting the catalyst and (ii) heating means. There is no particular limitation on other configurations and structures of the production apparatus. Examples of the production apparatus for use in the present invention include well-known production apparatuses such as a thermal CVD furnace, thermal heating furnace, electric furnace, drying furnace, thermoregulated bath, atmosphere furnace, gas replaced furnace, muffle furnace, oven, vacuum heating furnace, plasma reactor, microplasma reactor, RF plasma reactor, electromagnetic wave heating reactor, microwave irradiation reactor, infrared radiation heating furnace, ultraviolet heating reactor, MBE reactor, MOCVD reactor and laser heating apparatus.

Figure 2:
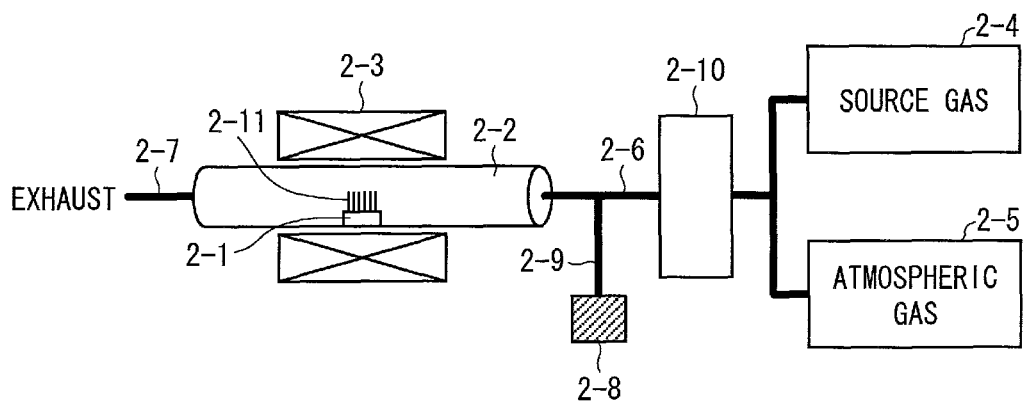
FIG. 2 is a view schematically illustrating a configuration of a CNT production apparatus, in which a base material for production of the aligned CNT aggregate in accordance with one embodiment of the present invention is used.

The carbon nanotubes of Examples of the present invention were synthesized with use of a CVD apparatus shown in FIG. 2. The CVD apparatus includes: a cylindrical reaction chamber 2-2 (30 mm in diameter and 360 mm in heating length) which contains a carbon nanotube formation base material 2-1 and is made from quartz glass; a heating coil 2-3 provided so as to externally surround the reaction chamber 2-2; a supply pipe 2-6 which is connected to an end of the reaction chamber 2-2 so as to supply source gas 2-4 and atmospheric gas 2-5; an exhaust pipe 2-7 connected to the other end of the reaction chamber 2-2; and a catalyst activation material supplying pipe 2-9 which is connected to a middle part of the supply pipe 2-6 so as to supply a catalyst activation material 2-8. Further, for the purpose of supplying an extremely small amount of the catalyst activation material in an accurately controlled manner, a purifying device 2-10 for removing catalyst activation materials derived from the source gas 2-4 and the atmospheric gas 2-5 is provided to the supply pipe 2-6 for supplying the source gas 2-4 and the atmospheric gas 2-5. In addition, a control apparatus including a flow control valve and/or a pressure control valve is provided in an appropriate location (not illustrated).

[Compositions of Catalyst Support Layer Coating Agent and Catalyst Formation Layer Coating Agent]

The following Table 1 shows the compositions of all the catalyst support layer coating agents and the catalyst formation layer coating agents prepared in Examples 1 to 5 and Comparative Examples 1 and 2.

TABLE 1

| | | | Example 1 | Example 2 | Example 3 | Example 4 | Example 5 | Comparative Example 1 | Comparative Example 2 |
|---|---|---|---|---|---|---|---|---|---|
| Catalyst support layer coating agent | Composition (g) | Ethanol | 100 | — | — | 39 | — | 100 | — |
| | | IPA | — | 100 | 78 | — | — | — | — |
| | | Heptane | — | — | — | 34 | — | — | — |
| | | Butyl acetate | — | — | — | — | 88 | — | — |
| | | DMF | — | — | — | — | — | — | 100 |
| | | Al tri-sec-butoxide | 1.85 | — | 1.9 | — | 1.9 | 1.85 | 3 (Alumina sol) |
| | | Al tri-iso-propoxide | — | — | — | 1.5 | — | — | — |
| | | Aluminum chloride | — | 1 | — | — | — | — | — |
| | | Triethanolamine | 1.12 | — | — | — | — | — | — |
| | | Triisopropanolamine | — | — | 0.9 | — | — | — | — |
| | | Diisopropanolamine | — | — | — | 1 | — | — | — |
| | | Ethyl acetoacetate | — | 0.98 | — | — | 0.9 | — | — |
| | | Water | — | — | — | — | — | 0.2 | — |
| | Baking condition (° C.) | | 300 | 300 | 300 | 300 | 300 | 700 | 700 |
| Catalyst formation layer coating agent | Composition (g) | Ethanol | 100 | 100 | — | — | — | 100 | 250 |
| | | IPA | — | — | 78 | — | 78 | — | — |
| | | Mineral spirit | — | — | — | 0.485 | — | — | — |
| | | Butyl acetate | — | — | — | 88 | — | — | — |
| | | Iron lactate trihydrate | 0.288 | — | — | — | — | — | 1.52 (Iron oxide sol) |
| | | Iron nitrate nonahydrate | — | 0.404 | — | — | — | 0.404 | — |
| | | Iron acetate | — | — | 0.174 | — | 0.174 | — | — |
| | | iron 2-ethylhexanoate | — | — | — | 0.485 | — | — | — |
| | | Triethanolamine | 0.149 | 0.149 | — | — | — | — | — |
| | | Triisopropanolamine | — | — | 0.19 | — | — | — | — |
| | | Ethyl acetoacetate | — | — | — | 0.13 | — | — | — |
| | | Acetylacetone | — | — | — | — | 0.1 | — | — |
| | Baking condition (° C.) | | 100 | 100 | 100 | 100 | 100 | 700 | 700 |

INDUSTRIAL APPLICABILITY

The present invention is suitably usable in the fields of electronic device materials, optical element materials and electrically conducting materials etc.

REFERENCE SIGNS LIST

1 Base material
1-1 Substrate
1-2 Catalyst support layer
1-3 Catalyst formation layer
2-1 Carbon nanotube formation base material
2-2 Reaction chamber
2-3 Heating coil
2-4 Source gas
2-5 Atmospheric gas
2-6 Supply pipe
2-7 Exhaust pipe
2-8 Catalyst activation material
2-9 Catalyst activation material supplying pipe
2-10 Purifying device

The invention claimed is:

1. A method of producing an aligned carbon nanotube aggregate, comprising the steps of:
dissolving in an organic solvent (i) an organometallic compound containing aluminum and/or a metal salt containing aluminum and (ii) a stabilizer for inhibiting a condensation polymerization reaction of the organometallic compound and the metal salt to obtain a catalyst support layer coating agent;
applying the catalyst support layer coating agent to a substrate;
heating the catalyst support layer coating agent to obtain a catalyst support layer on the substrate;
dissolving in an organic solvent (a) an organometallic compound containing iron and/or a metal salt containing iron and (b) a stabilizer for inhibiting a condensation polymerization reaction of the organometallic compound and the metal salt to obtain a catalyst formation layer coating agent;
applying the catalyst formation layer coating agent to the catalyst support layer;
heating the catalyst formation layer coating agent to obtain a catalyst formation layer on the catalyst support layer; and
growing an aligned carbon nanotube aggregate on the substrate by chemical vapor deposition (CVD).

2. The method according to claim 1, wherein the stabilizer contained in the catalyst support layer coating agent is an alkanolamine and/or a β-diketone.

3. The method according to claim 1, wherein the stabilizer contained in the catalyst formation layer coating agent is an alkanolamine and/or β-diketone.

4. The method according to claim 1, wherein the catalyst support layer coating agent is heated at a temperature not lower than 200° C. but not higher than 400° C. after being applied.

5. The method according to claim 4, wherein the catalyst support layer coating agent is heated for not less than 5 minutes but not more than 3 hours.

6. The method according to claim 1, wherein the catalyst formation layer coating agent is heated at a temperature not lower than 50° C. but not higher than 200° C. after being applied.

7. The method according to claim 1, wherein the catalyst support layer contains an aluminum atom and a carbon atom.

8. The method according to claim 7, wherein the catalyst support layer further contains an oxygen atom.

9. The method according to claim 1, wherein the catalyst support layer is porous.

10. The method according to claim 1, wherein, in the step of growing the aligned carbon nanotube aggregate on the substrate, a catalyst activation material is present in an atmosphere where the aligned carbon nanotube aggregate grows.

11. The method according to claim 1, further comprising, before the step of growing the aligned carbon nanotube aggregate,
- a formation step for reducing the catalyst formation layer and allowing the catalyst formation layer to become fine particles by (i) placing the substrate in an environment including a reducing gas and (ii) heating the substrate and/or the reducing gas.

12. The method according to claim 1, wherein at least one selected from the group consisting of the organometallic compound and the metal salt contained in the catalyst support layer coating agent is aluminum alkoxide.

13. The method according to claim 1, wherein at least one selected from the group consisting of the organometallic compound and the metal salt contained in the catalyst formation layer coating agent is an iron salt of organic acid.

14. The method according to claim 1, wherein the catalyst support layer has a layer thickness of not smaller than 10 nm but not larger than 100 nm.

15. The method according to claim 1, wherein the catalyst formation layer has a layer thickness of not smaller than 1 nm but not larger than 10 nm.

16. The method according to claim 1, wherein a molar ratio of the stabilizer contained in the catalyst support layer coating agent to a sum of the organometallic compound and the metal salt contained in the catalyst support layer coating agent is not less than 0.01:1 but not more than 3.0:1.

17. The method according to claim 1, wherein a molar ratio of the stabilizer contained in the catalyst formation layer coating agent to a sum of the organometallic compound and the metal salt contained in the catalyst formation layer coating agent is not less than 0.01:1 but not more than 3.0:1.

* * * * *